United States Patent
Hintermann et al.

(10) Patent No.: US 8,933,138 B2
(45) Date of Patent: Jan. 13, 2015

(54) PHOTO-LATENT TITANIUM-CHELATE CATALYSTS

(75) Inventors: Tobias Hintermann, Therwil (CH); Didier Bauer, Kembs (FR); Antoine Carroy, Limburgerhof (DE); Caroline Lordelot, Mannheim (DE); Rachel Kohli Steck, Basel (CH)

(73) Assignee: BASF SE, Ludwigshafen (DE)

( * ) Notice: Subject to any disclaimer, the term of this patent is extended or adjusted under 35 U.S.C. 154(b) by 61 days.

(21) Appl. No.: 13/395,464

(22) PCT Filed: Sep. 1, 2010

(86) PCT No.: PCT/EP2010/062779
§ 371 (c)(1),
(2), (4) Date: Jun. 20, 2012

(87) PCT Pub. No.: WO2011/032837
PCT Pub. Date: Mar. 24, 2011

(65) Prior Publication Data
US 2012/0259033 A1    Oct. 11, 2012

(30) Foreign Application Priority Data
Sep. 15, 2009    (EP) .................................. 09170294

(51) Int. Cl.
C08G 18/22    (2006.01)
C08J 3/28    (2006.01)
C07F 7/28    (2006.01)
B01J 31/12    (2006.01)

(52) U.S. Cl.
USPC .............. 521/124; 502/171; 522/33; 522/36; 522/39; 522/66; 522/134; 522/174; 528/45; 528/56; 556/51; 556/54

(58) Field of Classification Search
USPC .......... 502/171; 522/33, 36, 39, 66, 134, 174; 528/45, 56; 556/51, 54, 55, 56; 521/124
See application file for complete search history.

(56) References Cited

U.S. PATENT DOCUMENTS 3,635,906 A * 1/1972 Jayawant ........................ 528/58
4,292,252 A    9/1981 Collins et al.
5,545,600 A    8/1996 Knudsen et al.
8,318,830 B2 * 11/2012 Kohli Steck et al. ........... 522/33
2003/0118725 A1 * 6/2003 Shin ........................... 427/248.1
2005/0282700 A1    12/2005 Feldman et al.
2006/0293486 A1    12/2006 Emmrich
2010/0055474 A1    3/2010 Bachon et al.
2010/0234485 A1    9/2010 Kohli Steck

FOREIGN PATENT DOCUMENTS

WO    2006136211    12/2006
WO    2007147851    12/2007
WO    2009/050115 A1    4/2009
WO    WO 2009/050115 A1 *    4/2009

OTHER PUBLICATIONS

Mi X et al. Polymer Bulletin, Springer, Heidelberg, DE, vol. 47, No. 6, Feb. 1, 2002, pp. 521-527.
Kuhn et al., Inorganica Chimica Acta, Elsevier BV, NL, vol. 362, No. 9, Jul. 1, 2009, pp. 3088-3096.

* cited by examiner

Primary Examiner — Rabon Sergent
(74) Attorney, Agent, or Firm — Shruti Costales

(57) ABSTRACT

The present invention provides photolatent Ti-chelate catalyst compounds of formula (I), wherein $R_1$ is for example $C_6$-$C_{14}$ aryl which is substituted by one or more $R'_2$, $R'_3$ or $R'_4$; or the two $R_1$ together are unsubstituted linear or branched $C_1$-$C_{12}$ alkylene; $R_2$, $R_3$, $R_4$, $R'_2$, $R'_3$, and $R'_4$ independently of each other are for example hydrogen, halogen or linear or branched $C_1$-$C_{20}$ alkyl; $R_5$, $R_6$ and $R_7$ independently of each other are hydrogen, linear or branched $C_1$-$C_{20}$ alkyl, $C_6$-$C_{14}$ aryl, Br or Cl, provided that not more than one of $R_5$, $R_6$ and $R_7$ is hydrogen; as well as formulations comprising said compounds and defined 1,3-diketones.

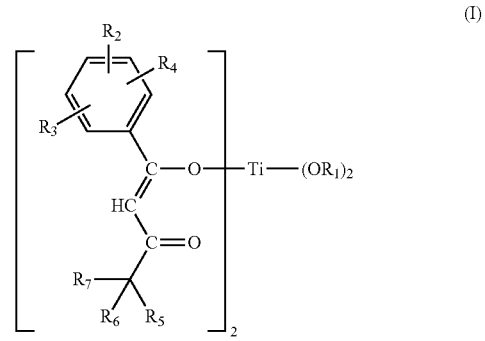

18 Claims, No Drawings

PHOTO-LATENT TITANIUM-CHELATE CATALYSTS

The present invention pertains to novel photolatent catalyst compounds and their application as catalysts in particular for crosslinking 2 pot polyurethane.

It is known in the art to prepare for example polyurethanes (PU) by crosslinking isocyanate components with polyols, including any hydroxyl-functional compounds and also polythiols, in the presence of an organometallic, in particular a tin, catalyst. Corresponding catalysts are known from many publications, for example US2005/0282700, U.S. Pat. No. 5,545,600, U.S. Pat. No. 4,292,252, etc. The same type of organometallic catalyst can also be used in order to catalyze the crosslinking via other condensation or addition reactions, such as for example siloxane modified binders as they are used in silane crosslinking adhesives or sealings, as reported for example in WO2006/136211.

The standard catalysts used today are based on Sn compounds. These catalysts are not latent and thus the reaction between the polyol and the poly-isocyanates is accelerated as soon as the catalyst is added. After a short reaction time (around 0.5 h to 2 h, depending on the concentrations and the conditions), the reaction is completed. This reaction time limits the working window with the resin system after the mixture has been produced.

Thus it is highly desirable to be able to trigger the reaction only on demand through an external activation such as heat or light. This would allow extending the working window with the resins mixture ideally until the external trigger is turned on.

A further problem underlying the invention resides in the legislative pressure on tin catalysts due to the environmental issues raised by these products. A general trend seen in this industry is the replacement of tin catalysts by alternative metals, less or not detrimental to the environment.

Photo-latent catalysts for PU crosslinking have been reported in prior art (e.g. WO2007/147851 and WO2009/050115). These catalysts can be activated by irradiation with UV light. The prior art describes mostly photo-latent tin-catalysts, but also Bi, Zr, Al, and Ti catalysts. Only very few examples of photo-latent Ti catalysts are described. These Ti catalysts do show a nice photo-latent behaviour, however PU formulations containing them provide an insufficient pot-life.

It has now been found that specific Ti-chelate complexes also provide sufficient pot-life stability.

Thus, the present invention resides in a Ti-chelate catalyst compounds of formula I

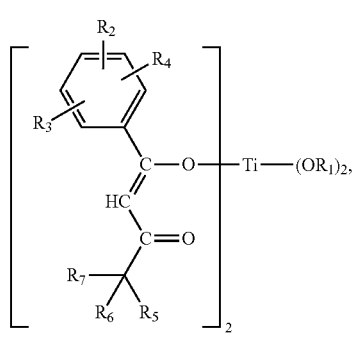

(I)

wherein $R_1$ denotes $C_6$-$C_{14}$aryl which is substituted by one or more $R'_2$, $R'_3$ or $R'_4$;

or the two $R_1$ together are unsubstituted linear or branched $C_1$-$C_{12}$alkylene or are linear or branched $C_1$-$C_{12}$alkylene which is substituted by one or more phenyl, benzoyl, naphthyl or by naphthoyl, or the two $R_1$ together are unsubstituted linear or branched $C_2$-$C_{12}$alkylene which is interrupted by one or more non-consecutive O-atoms or are linear or branched $C_2$-$C_{12}$alkylene which is interrupted by one or more non-consecutive O-atoms which is substituted by one or more phenyl, benzoyl, naphthyl or by naphthoyl, or the two $R_1$ together are phenylene, biphenylene or naphthylene, wherein said phenylene, biphenylene or naphthylene are unsubstituted or are substituted by one or more $R'_2$, $R'_3$ or $R'_4$, or the two $R_1$ together are —$(CH_2)_n$-phenylene-$(CH_2)_n$—, wherein the $CH_2$ groups optionally are substituted by $C_1$-$C_{20}$alkyl or $C_6$-$C_{14}$aryl;

n is an integer 1 or 2;

$R_2$, $R_3$, $R_4$, $R'_2$, $R'_3$, and $R'_4$ independently of each other are hydrogen, halogen, linear or branched $C_1$-$C_{20}$alkyl, $C_1$-$C_{20}$alkoxy, $C_6$-$C_{14}$aryl, $C_1$-$C_{20}$alkanoyl, $C_1$-$C_{20}$alkanoyloxy, $C_1$-$C_{20}$alkoxycarbonyl, $C_7$-$C_{15}$aroyl, $C_7$-$C_{15}$aroyloxy, nitrile, nitro, $C_1$-$C_{20}$alkylthio, $C_6$-$C_{14}$arylthio or $NR_8R_9$;

$R_5$, $R_6$ and $R_7$ independently of each other are hydrogen, linear or branched $C_1$-$C_{20}$alkyl, $C_6$-$C_{14}$aryl or halogen, provided that not all of $R_5$, $R_6$ and $R_7$ are halogen and provided that not more than one of $R_5$, $R_6$ and $R_7$ is hydrogen, or $R_5$ and $R_6$ together with the C-atom to which they are attached form a 5 to 7 membered saturated ring;

$R_8$ and $R_9$ independently of each other are hydrogen, linear or branched $C_1$-$C_{20}$alkyl, benzyl, $C_7$-$C_{15}$aroyl, $C_1$-$C_{20}$alkanoyl, unsubstituted phenyl, phenyl which is substituted by one or more halogen, $C_1$-$C_6$alkoxy or by $C_1$-$C_6$alkyl, or $R_8$ and $R_9$ together with the N-atom to which they are attached form a 5- or 6-membered saturated or unsaturated ring, which ring optionally in addition to the N-atom comprises a further N-atom or O-atom and to which ring optionally one or two benzo rings are fused.

The Ti-chelate compounds of the formula I differ from the prior art in the nature of the substituent $OR_1$. $OR_1$ is a phenolate, or the two ligands $OR_1$, are covalently linked together to form a bidentate ligand. The photo-latent Ti compounds of the present invention are surprisingly found to have a longer pot-life, but equivalent photo-latency compared to the state of the art.

The invention additionally deals with the use of specific combinations of the Ti-chelate compounds with an excess (1-50% w/w) of specific chelate ligands that leads to a significant improvement of pot-life of the formulation while maintaining a good photo-latency of the catalyst. The addition of only a small amount of specific 1,3-diketone additives to the photo-latent Ti compounds which is an object of the present invention was surprisingly found to lead to a longer pot-life, but equivalent photo-latency compared with the state of the art.

Subject of the invention therefore further is a Ti-chelate catalyst formulation, comprising
(i) at least one compound of the formula IA

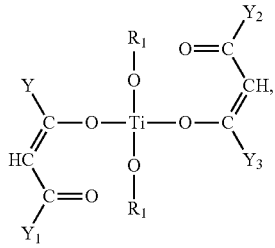
(IA)

wherein
R$_1$ denotes C$_6$-C$_{14}$aryl which is substituted by one or more R'$_2$, R'$_3$ or R'$_4$;
or the two R$_1$ together are unsubstituted linear or branched C$_1$-C$_{12}$alkylene or are linear or branched C$_1$-C$_{12}$alkylene which is substituted by one or more phenyl, benzoyl, naphthyl or by naphthoyl,
or the two R$_1$ together are unsubstituted linear or branched C$_2$-C$_{12}$alkylene which is interrupted by one or more non-consecutive O-atoms or are linear or branched C$_2$-C$_{12}$alkylene which is interrupted by one or more non-consecutive O-atoms which is substituted by one or more phenyl, benzoyl, naphthyl or by naphthoyl,
or the two R$_1$ together are phenylene, biphenylene or naphthylene, wherein said phenylene, biphenylene or naphthylene are unsubstituted or are substituted by one or more R'$_2$, R'$_3$ or R'$_4$,
or the two R$_1$ together are —(CH$_2$)$_n$-phenylene-(CH$_2$)$_n$—, wherein the CH$_2$ groups optionally are substituted by C$_1$-C$_{20}$alkyl or C$_6$-C$_{14}$aryl;
Y is

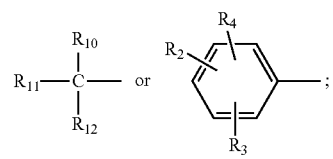

Y$_1$ is

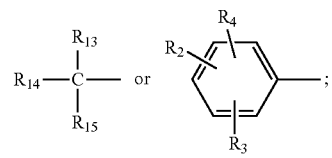

Y$_2$ is

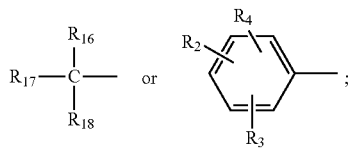

Y$_3$ is

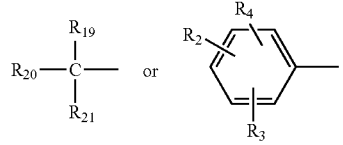

R$_2$, R$_3$, R$_4$, R'$_2$, R'$_3$, and R'$_4$ independently of each other are hydrogen, halogen, linear or branched C$_1$-C$_{20}$alkyl, C$_1$-C$_{20}$alkoxy, C$_6$-C$_{14}$aryl, C$_1$-C$_{20}$alkanoyl, C$_1$-C$_{20}$alkanoyloxy, C$_1$-C$_{20}$alkoxycarbonyl, C$_7$-C$_{15}$aroyl, C$_7$-C$_{15}$aroyloxy, nitrile, nitro, C$_1$-C$_{20}$alkylthio, C$_6$-C$_{14}$arylthio or NR$_8$R$_9$;
R$_8$ and R$_9$ independently of each other are hydrogen, linear or branched C$_1$-C$_{20}$alkyl, benzyl, C$_7$-C$_{15}$aroyl, C$_1$-C$_{20}$alkanoyl, unsubstituted phenyl, phenyl which is substituted by one or more halogen, C$_1$-C$_6$alkoxy or by C$_1$-C$_6$alkyl, or R$_8$ and R$_9$ together with the N-atom to which they are attached form a 5- or 6-membered saturated or unsaturated ring, which ring optionally in addition to the N-atom comprises a further N-atom or O-atom and to which ring optionally one or two benzo rings are fused;
R$_{10}$, R$_{11}$, R$_{12}$, R$_{13}$, R$_{14}$, R$_{15}$, R$_{16}$, R$_{17}$, R$_{18}$, R$_{19}$, R$_{20}$ and R$_{21}$ independently of one another are hydrogen, linear or branched C$_1$-C$_{20}$alkyl, C$_6$-C$_{14}$aryl or halogen, provided that not more than one of R$_{10}$, R$_{11}$, R$_{12}$ is hydrogen and not more than one of R$_{13}$, R$_{14}$, R$_{15}$ is hydrogen and not more than one of R$_{16}$, R$_{17}$, R$_{18}$ is hydrogen and not more than one of R$_{19}$, R$_{20}$, R$_{21}$ is hydrogen, or R$_{10}$ and R$_{11}$, R$_{13}$ and R$_{14}$, R$_{16}$ and R$_{17}$, or R$_{19}$ and R$_{20}$ together with the C-atom to which they are attached form a 5 to 7 membered saturated ring; and
(ii) at least one chelate ligand compound of the formula IIa, IIb or IIc

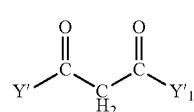
(IIa)

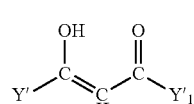
(IIb)

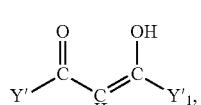
(IIc)

wherein
Y' is

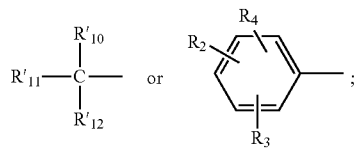

$Y'_1$ is

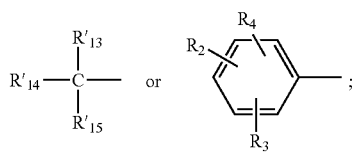

and $R'_{10}$, $R'_{11}$, $R'_{12}$, $R'_{13}$, $R'_{14}$ and $R'_{15}$ have on of the meanings as given for $R_{10}$, $R_{11}$, $R_{12}$, $R_{13}$, $R_{14}$, $R_{15}$.

$C_1$-$C_{20}$alkyl is linear or branched or cyclic and is, for example, $C_1$-$C_{18}$-, $C_1$-$C_{14}$-, $C_1$-$C_{12}$-, $C_1$-$C_8$-, $C_1$-$C_6$- or $C_1$-$C_4$alkyl. Examples are methyl, ethyl, propyl, isopropyl, n-butyl, sec-butyl, isobutyl, tert-butyl, pentyl, e.g. cyclopentyl, hexyl, e.g. cyclohexyl, heptyl, 2,4,4-trimethylpentyl, 2-ethylhexyl, octyl, nonyl, decyl, dodecyl, tetradecyl, pentadecyl, hexadecyl, octadecyl and icosyl, preferably methyl, ethyl, propyl, isopropyl, n-butyl, sec-butyl, isobutyl, tert-butyl.

$C_1$-$C_{18}$alkyl, $C_1$-$C_{14}$alkyl, $C_1$-$C_{12}$alkyl, $C_1$-$C_8$alkyl, $C_1$-$C_6$alkyl and $C_1$-$C_4$alkyl have the same meanings as given above for $C_1$-$C_{20}$alkyl up to the corresponding number of C-atoms.

$C_6$-$C_{14}$aryl is for example phenyl, naphthyl, anthryl or phenanthryl, in particular phenyl or naphthyl, preferably phenyl.

$C_6$-$C_{14}$aryl which is substituted by one or more $R'_2$, $R'_3$ or $R'_4$ is for example substituted 1-5 times, e.g. 1-4, times or one, twice or three times with $R'_2$, $R'_3$ or $R'_4$. The substituents are for example bound in the 2,4,6-, 2,6-, 2,4-, 2,5-, 2,3,4-, 2-, 4- or 5-position of the phenyl ring.

$C_1$-$C_{12}$alkylene is linear or branched alkylene, for example methylene, ethylene, propylene, 1-methylethylene 1,2-dimethylethylene, 1,1,2,2-tetramethylethylene 1,4-dimethyl-butylene, 1,3-dimethylpropylene, butylene, 1-methylpropylene, 2-methyl-propylene, pentylene, hexylene, heptylene, octylene, nonylene, decylene or dodecylene, in particular ethylene, propylene 1,2-dimethylethylene, 1,1,2,2-tetramethylethylene, 1,4-dimethylbutylene or 1,3-dimethylpropylene.

Halogen denotes a fluoro, chloro, bromo or iodo radical, especially fluoro, chloro or bromo, in particular chloro and bromo.

$C_1$-$C_{20}$-alkoxy is linear or branched and is for example $C_1$-$C_{16}$-, $C_1$-$C_{12}$-, $C_1$-$C_8$-, $C_1$-$C_8$- or $C_1$-$C_4$-alkoxy. Examples are methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy, octyloxy, nonyloxy, decyloxy, dodecyloxy, hexadecyloxy, octadecyloxy or icosyloxy, in particular methoxy, ethoxy, propoxy, isopropoxy, n-butyloxy, sec-butyloxy, iso-butyloxy, tert-butyloxy, especially methoxy.

$C_1$-$C_{20}$alkanoyl is linear or branched and is, for example, $C_1$-$C_{18}$-, $C_1$-$C_{14}$-, $C_1$-$C_{12}$-, $C_1$-$C_8$-, $C_1$-$C_6$- or $C_1$-$C_4$alkanoyl or $C_4$-$C_{12}$- or $C_4$-$C_8$alkanoyl. Examples are formyl, acetyl, propionyl, butanoyl, isobutanoyl, pentanoyl, hexanoyl, heptanoyl, octanoyl, nonanoyl, decanoyl, dodecanoyl, tetradecanoyl, pentadecanoyl, hexadecanoyl, octadecanoyl, icosanoyl, preferably acetyl.

$C_2$-$C_{20}$alkanoyloxy is linear or branched, and is for example $C_2$-$C_{12}$-, $C_2$-$C_6$-, $C_2$-$C_4$-alkynoyloxy. Examples are acetyloxy, propionyloxy, butanoyloxy, isobutanoyloxy, preferably acetyloxy.

$C_7$-$C_{15}$aroyl is $C_6$-$C_{14}$aryl, as defined above, which at the "yl" moiety bears a —CO— group. Examples are benzoyl, naphthoyl, phenanthroyl and anthroyl, especially benzoyl and naphthoyl, in particular benzoyl.

$C_7$-$C_{15}$aroyloxy is $C_6$-$C_{14}$aryl, as defined above, which at the "yl" moiety bears a —(CO)O— group. Examples are benzoyloxy, naphthoyloxy, phenanthroyloxy and anthroyloxy, especially benzoyloxy and naphthoyloxy, in particular benzoyloxy.

$C_1$-$C_{20}$alkylthio is $C_1$-$C_{20}$alkyl, which at the "yl" moiety bears a S-atom. $C_1$-$C_{20}$alkyl has the same meanings as given above for $C_1$-$C_{20}$alkyl up to the corresponding number of C-atoms. $C_1$-$C_{20}$alkylthio is linear or branched or cyclic, for example, methylthio ethylthio, propylthio, isopropylthio, n-butylthio, sec-butylthio, isobutylthio, tert-butylthio, in particular methylthio.

$C_6$-$C_{14}$arylthio is $C_6$-$C_{14}$aryl, which at the "yl" moiety bears a S-atom. $C_6$-$C_{14}$aryl has the same meanings as given above for $C_6$-$C_{14}$aryl. Examples are phenylthio, naphthylthio, anthrylthio, phenanthrylthio, in particular phenylthio.

If $R_8$ and $R_9$ together with the N-atom to which they are attached form a 5- or 6-membered saturated or unsaturated ring, which ring optionally in addition to the N-atom comprises a further N-atom or O-atom, for example, pyrrole, pyrrolidine, oxazole, pyridine, 1,3-diazine, 1,2-diazine, piperidine or morpholine rings, in particular morpholine rings, are formed.

If said 5- or 6-membered saturated or unsaturated ring additionally is fused with one or two benzo rings, for example a carbazole structure is formed.

In case that the two $R_1$ of the formula I or IA together are linear or branched $C_1$-$C_{12}$alkylene for example structures like

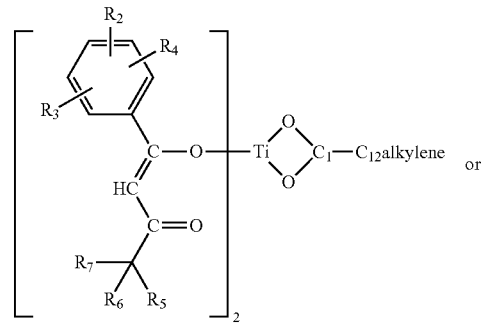

are formed, wherein the $C_1$-$C_{12}$alkylene is linear or branched as defined above and is optionally substituted as defined in the claims.

In case that the two $R_1$ of the formula I or IA together are phenylene, biphenylene or naphthylene for example structures like

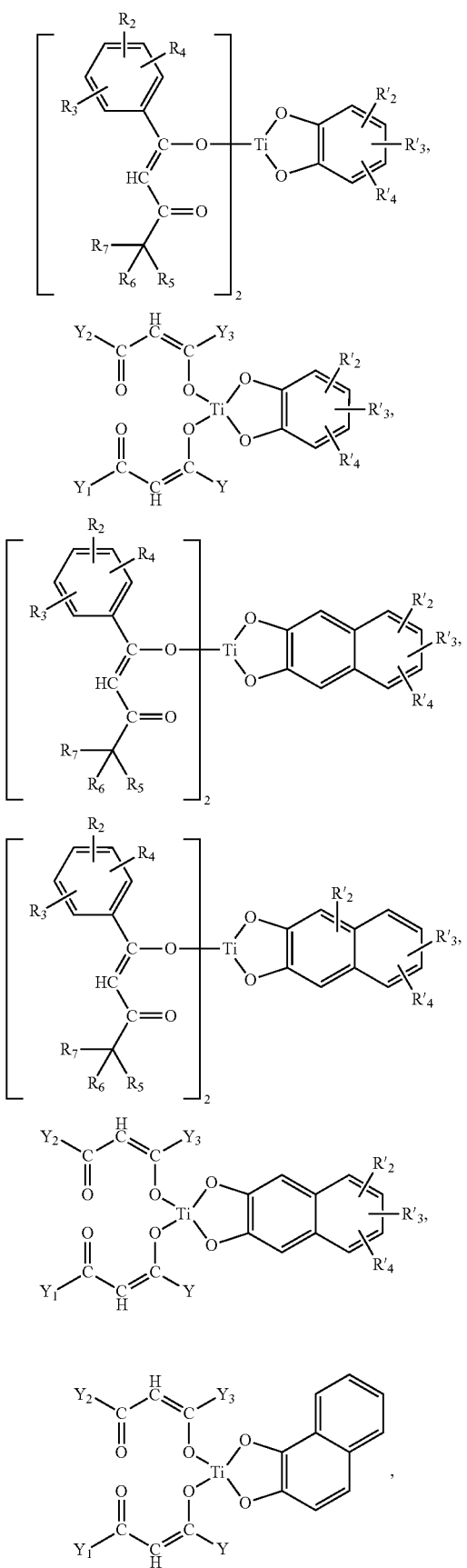

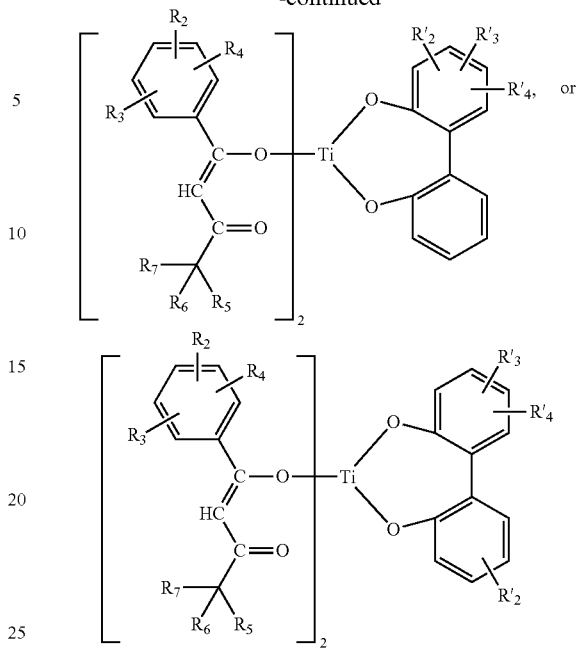

etc. are formed. It is evident, that in case that the aryl group consists of more than one ring, the substituents $R'_2$, $R'_3$ and $R'_4$ are situated at one ring only or distributed over the "more than one" rings.

If $R_{10}$ and $R_{11}$ together with the C-atom to which they are attached form a 5 to 7 membered saturated ring, or $R_{13}$ and $R_{14}$ together with the C-atom to which they are attached form a 5 to 7 membered saturated ring, or $R_{16}$ and $R_{17}$ together with the C-atom to which they are attached form a 5 to 7 membered saturated ring, or $R_{19}$ and $R_{20}$ together with the C-atom to which they are attached form a 5 to 7 membered saturated ring, said rings are cyclopentyl, cyclohexyl or cycloheptyl and for example structures like

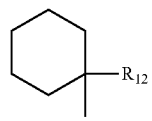

etc. are formed.

"photolatent catalyst" refers to a compound, which upon irradiation with light, in particular with light of the wavelengths 150-800 nm, e.g. 200-800 or 200-600 nm, provides an active catalyst.

The terms "and/or" or "or/and" in the present context are meant to express that not only one of the defined alternatives (substituents) may be present, but also several of the defined alternatives (substituents) together, namely mixtures of different alternatives (substituents).

The term "at least" is meant to define one or more than one, for example one or two or three, preferably one or two.

The term "optionally substituted" means that the radical to which it refers is either unsubstituted or substituted.

Throughout this specification and the claims which follow, unless the context requires otherwise, the word "comprise", or variations such as "comprises" or "comprising", will be understood to imply the inclusion of a stated integer or step or group of integers or steps but not the exclusion of any other integer or step or group of integers or steps.

The term "(meth)acrylate" in the context of the present application is meant to refer to the acrylate as well as to the corresponding methacrylate.

The preferences referring to the latent catalyst compounds in general (and in particular of the formula I, IA, I', I", IA' and IA") as given hereinbefore, below and in the context of the whole text, are intended not to refer to the compounds as such only, but to all categories of the claims. That is to the compositions, comprising the latent catalyst compounds, as well as the use or process claims in which said compounds are employed.

Interesting are for example compounds of the formula I as described above, wherein $R_1$ denotes phenyl which is substituted by one or more $R'_2$, $R'_3$ or $R'_4$;

or the two $R_1$ together are unsubstituted linear or branched $C_1$-$C_8$alkylene or are linear or branched $C_1$-$C_8$alkylene which is substituted by one or more phenyl, benzoyl, naphthyl or by naphthoyl, or the two $R_1$ together are unsubstituted linear or branched $C_2$-$C_8$alkylene which is interrupted by one or more non-consecutive O-atoms or are linear or branched $C_2$-$C_8$alkylene which is interrupted by one or more non-consecutive O-atoms which is substituted by one or more phenyl, benzoyl, naphthyl or by naphthoyl, or the two $R_1$ together are phenylene, biphenylene or naphthylene, wherein said phenylene, biphenylene or naphthylene are unsubstituted or are substituted by one or more $R'_2$, $R'_3$ or $R'_4$, or the two $R_1$ together are —$(CH_2)_n$-phenylene-$(CH_2)_n$—, wherein the $CH_2$ groups optionally are substituted by $C_1$-$C_{20}$alkyl or $C_6$-$C_{14}$aryl;

$R_2$, $R_3$, $R_4$, $R'_2$, $R'_3$, and $R'_4$ independently of each other are hydrogen, halogen, linear or branched $C_1$-$C_{12}$alkyl, $C_1$-$C_{12}$alkoxy, phenyl, $C_1$-$C_{12}$alkanoyl, $C_1$-$C_{12}$alkanoyloxy, $C_1$-$C_{12}$alkoxycarbonyl, benzoyl, benzoyloxy, nitrile, nitro, $C_1$-$C_{12}$alkylthio, phenylthio or $NR_8R_9$;

$R_5$, $R_6$ and $R_7$ independently of each other are hydrogen, linear or branched $C_1$-$C_{12}$alkyl, phenyl, halogen, provided that not all of $R_5$, $R_6$ and $R_7$ are halogen and, provided that not more than one of $R_5$, $R_6$ and $R_7$ is hydrogen, or $R_5$ and $R_6$ together with the C-atom to which they are attached form a 5 to 7 membered saturated ring;

$R_8$ and $R_9$ independently of each other are hydrogen, linear or branched $C_1$-$C_{12}$alkyl, benzoyl, $C_1$-$C_{12}$alkanoyl, unsubstituted phenyl, phenyl substituted by one or more halogen, $C_1$-$C_4$alkyl or by $C_1$-$C_4$alkoxy, benzyl, or $R_8$ and $R_9$ together with the N-atom to which they are attached form a 5- or 6-membered saturated or unsaturated ring, which optionally in addition to the N-atom comprises a further N-atom or O-atom and to which ring optionally one or two benzo rings are fused.

Interesting also are compounds of the formula I, wherein $R_1$ is phenyl which is substituted by one or more $R'_2$, $R'_3$ or $R'_4$;

or the two $R_1$ together as linear or branched unsubstituted or substituted $C_1$-$C_{20}$alkylene are —$C(R_{22})_2$—$(CH_2)_n$—$C(R_{22})_2$—;

n is an integer 1-3;

$R_{22}$ independently of each other are hydrogen, $C_1$-$C_4$alkyl, in particular methyl, phenyl or benzoyl;

$R_2$, $R_3$, $R_4$, $R'_2$, $R'_3$ and $R'_4$ independently of each other are as defined above, $R_5$ is hydrogen, $C_1$-$C_4$alkyl, phenyl or halogen, in particular $R_5$ is methyl; and $R_6$ and $R_7$ are methyl.

For example compounds of the formula I' and I"

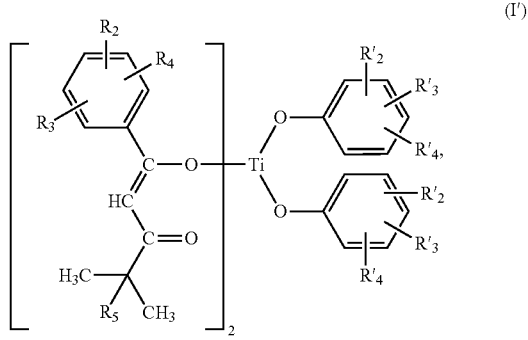

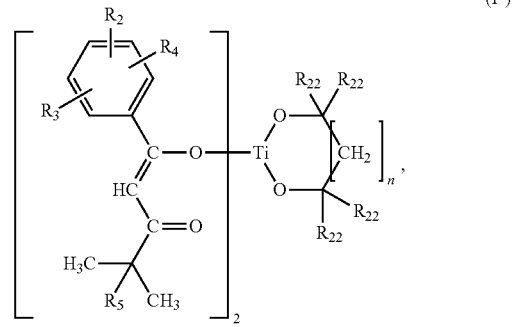

wherein $R_2$, $R_3$, $R_4$, $R'_2$, $R'_3$, $R'_4$, $R_5$, $R_{22}$ and n are as defined above.

Preferably in the formula I, I' and I" $R'_2$, $R'_3$ and $R'_4$ independently of one another are hydrogen, $C_1$-$C_4$alkyl or $C_1$-$C_4$alkoxy.

In the formula I", $R_{22}$ preferably is hydrogen, $C_1$-$C_4$alkyl, in particular methyl or phenyl and n preferably is 1 or 2.

Interesting also are compounds of the formula IA, wherein $R_1$ is phenyl which is substituted by one or more $R'_2$, $R'_3$ or $R'_4$;

or the two $R_1$ together as linear or branched unsubstituted or substituted $C_1$-$C_{20}$alkylene are —$C(R_{22})_2$—$(CH_2)_n$—$C(R_{22})_2$—;

n is an integer 1-3;

$R_{22}$ independently of each other are hydrogen, $C_1$-$C_4$alkyl, in particular methyl, phenyl or benzoyl.

Y is

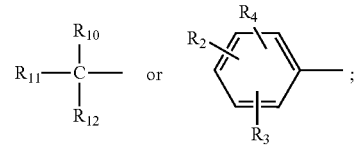

$Y_1$ is

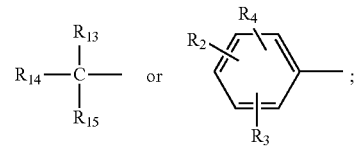

$Y_2$ is

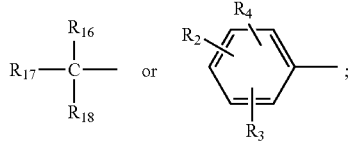

$Y_3$ is

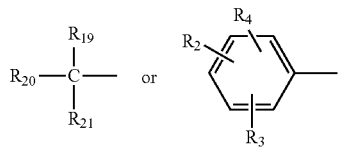

$R_2$, $R_3$, $R_4$, $R'_2$, $R'_3$ and $R'_4$ independently of each other are as defined above, $R_{10}$, $R_{11}$, $R_{13}$, $R_{14}$, $R_{16}$, $R_{17}$, $R_{19}$ and $R_{20}$ independently of one another are hydrogen, $C_1$-$C_4$alkyl, phenyl or halogen, in particular $R_{10}$, $R_{11}$, $R_{13}$, $R_{14}$, $R_{16}$, $R_{17}$, $R_{19}$ and $R_{20}$ are methyl; and $R_{12}$, $R_{15}$, $R_{18}$ and $R_{21}$ are methyl.

For example compounds of the formula IA' and IA''

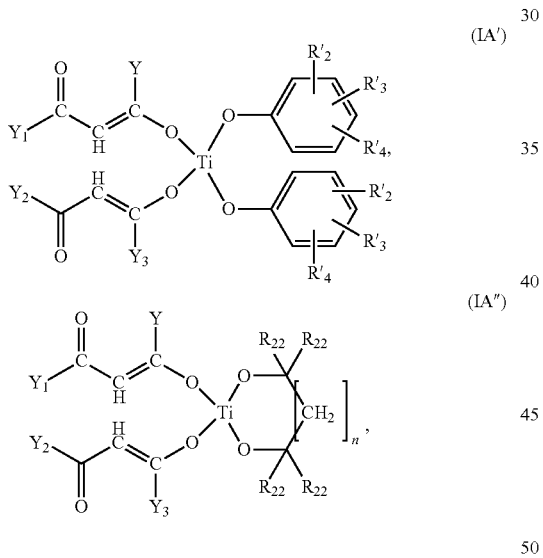

wherein $Y$, $Y_1$, $Y_2$, $Y_3$, $R'_2$, $R'_3$, $R'_4$, $R_{22}$ and n are as defined above.

Interesting are in particular compounds of the formula I as defined above, wherein $R_1$ is phenyl which is substituted by one or more $R'_2$, $R'_3$ or $R'_4$;

or the two $R_1$ together are unsubstituted linear or branched $C_1$-$C_6$alkylene, linear or branched $C_1$-$C_6$alkylene which is substituted by one or more phenyl or benzoyl, or the two $R_1$ together are biphenylene;

$R_2$, $R_3$ and $R_4$ independently of each other are hydrogen or $C_1$-$C_4$alkoxy;

$R'_2$, $R'_3$, $R'_4$ independently of each other are hydrogen or $C_1$-$C_4$alkyl;

$R_5$, $R_6$ and $R_7$ are $C_1$-$C_4$alkyl, in particular methyl.

Interesting further is a Ti-chelate catalyst formulation as described above, wherein the compounds of formula IA $R_1$ is phenyl which is substituted by one or more $R'_2$, $R'_3$ or $R'_4$;

or the two $R_1$ together are unsubstituted linear or branched $C_1$-$C_6$alkylene, linear or branched $C_1$-$C_6$alkylene which is substituted by one or more phenyl or benzoyl, or the two $R_1$ together are biphenylene;

$R_2$, $R_3$ and $R_4$ independently of each other are hydrogen or $C_1$-$C_4$alkoxy;

$R'_2$, $R'_3$, $R'_4$ independently of each other are hydrogen or $C_1$-$C_4$alkyl;

Y is

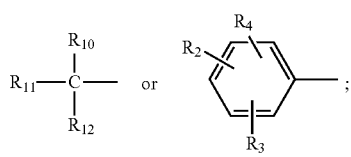

$Y_1$ is

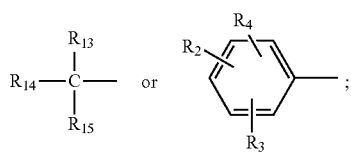

$Y_2$ is

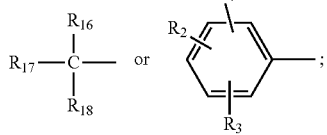

$Y_3$ is

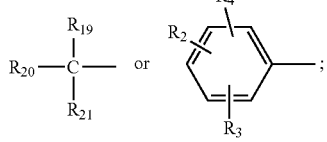

$R_{10}$, $R_{11}$, $R_{12}$, $R_{13}$, $R_{14}$, $R_{15}$, $R_{16}$, $R_{17}$, $R_{18}$, $R_{19}$, $R_{20}$ and $R_{21}$ are $C_1$-$C_4$alkyl, in particular methyl.

Of interest in particular is a Ti-chelate catalyst formulation, comprising (i) at least one compound of the formula I, as defined above; and (ii) at least one chelate ligand compound of the formula IIa, IIb or IIc

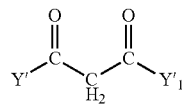

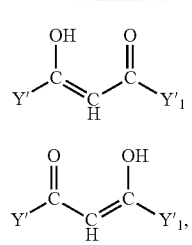 (IIb)

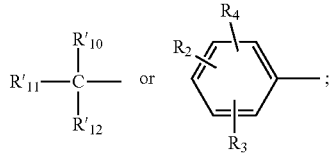 (IIc)

wherein
Y' is

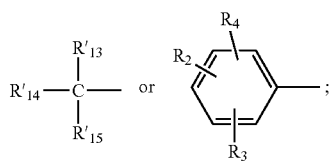

Y'$_1$ is

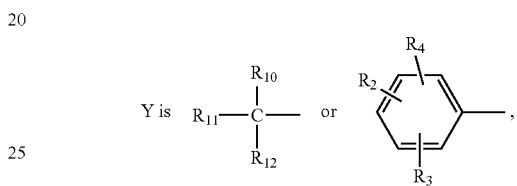

and

R'$_{10}$, R'$_{11}$, R'$_{12}$, R'$_{13}$, R'$_{14}$ and R'$_{15}$ have on of the meanings as given for R$_{10}$, R$_{11}$, R$_{12}$, R$_{13}$, R$_{14}$, R$_{15}$.

R$_1$ for example denotes phenyl or naphthyl, both of which are substituted by one or more R'$_2$, R'$_3$ or R'$_4$;

or the two R$_1$ together are unsubstituted linear or branched C$_1$-C$_8$alkylene, linear or branched C$_1$-C$_8$alkylene which is substituted by one or more phenyl or benzoyl, or the two R$_1$ together are phenylene or biphenylene, wherein said phenylene or biphenylene are unsubstituted or are substituted by one or more R'$_2$, R'$_3$ or R'$_4$;

Preferably R$_1$ is phenyl which is substituted by one or more R'$_2$, R'$_3$ or R'$_4$; or the two R$_1$ together are unsubstituted linear or branched C$_1$-C$_8$alkylene, linear or branched C$_1$-C$_8$alkylene which is substituted by one or more phenyl or benzoyl, or the two R$_1$ together are phenylene or biphenylene, in particular biphenylene, wherein said phenylene or biphenylene are unsubstituted or are substituted by one or more R'$_2$, R'$_3$ or R'$_4$.

R$_2$, R$_3$, R$_4$, R'$_2$, R'$_3$, and R'$_4$ for example independently of each other are hydrogen, halogen, linear or branched C$_1$-C$_{20}$alkyl, C$_1$-C$_{20}$alkoxy, C$_6$-C$_{14}$aryl, C$_1$-C$_{20}$alkanoyl, C$_2$-C$_{20}$alkanoyloxy, C$_7$-C$_{15}$aroyl, C$_7$-C$_{15}$aroyloxy, nitrile, nitro, C$_1$-C$_{20}$alkylthio, C$_6$-C$_{14}$arylthio or NR$_8$R$_9$;

R$_2$, R$_3$ and R$_4$ for example independently of each other are hydrogen, linear or branched C$_1$-C$_{12}$alkyl, C$_1$-C$_{12}$alkoxy or phenyl; for example hydrogen, linear or branched C$_1$-C$_{12}$alkyl or C$_1$-C$_{12}$alkoxy; in particular hydrogen or C$_1$-C$_4$alkoxy.

R'$_2$, R'$_3$, and R'$_4$ for example independently of each other are hydrogen, linear or branched C$_1$-C$_{12}$alkyl, C$_1$-C$_{12}$alkoxy or phenyl; for example are hydrogen, linear or branched C$_1$-C$_{12}$alkyl or C$_1$-C$_{12}$alkoxy; in particular are are hydrogen or linear or branched C$_1$-C$_4$alkyl.

R$_5$, R$_6$ and R$_7$ independently of each other for example are hydrogen, linear or branched C$_1$-C$_{12}$alkyl or phenyl, provided that not more than one of R$_5$, R$_6$ and R$_7$ is hydrogen; or for example are hydrogen or linear or branched C$_1$-C$_{12}$alkyl, in particular linear or branched C$_1$-C$_4$alkyl, especially methyl. For example two of the radicals R$_5$, R$_6$ and R$_7$ are linear or branched C$_1$-C$_4$alkyl, especially methyl, and the other (third) radical is hydrogen.

R$_8$ and R$_9$ for example are independently of each other are hydrogen, linear or branched C$_1$-C$_6$alkyl, phenyl, benzyl or R$_8$ and R$_9$ together with the N-atom to which they are attached form a 5- or 6-membered saturated ring, which ring optionally in addition to the N-atom comprises a further N-atom or O-atom, preferably an O-atom; or R$_8$ and R$_9$ for example are independently of each other are hydrogen, linear or branched C$_1$-C$_6$alkyl, phenyl, benzyl or R$_8$ and R$_9$ together with the N-atom to which they are attached form a morpholino ring; or R$_8$ and R$_9$ for example are independently of each other are hydrogen, linear or branched C$_1$-C$_6$alkyl, phenyl or benzyl.

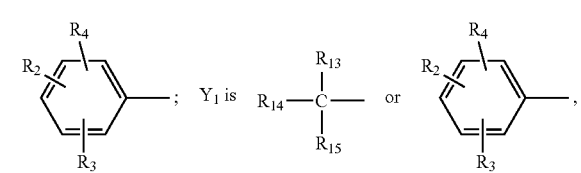

in particular

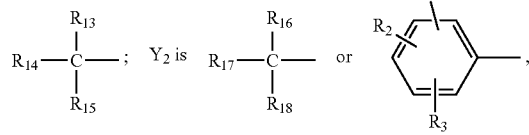

in particular

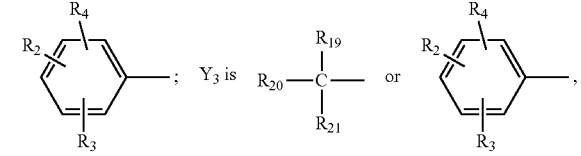

in particular

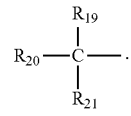.

$R_{10}$, $R_{11}$, $R_{12}$ independently of one another are hydrogen, linear or branched $C_1$-$C_{20}$alkyl, $C_6$-$C_{14}$aryl or halogen, or $R_{10}$ and $R_{11}$ together with the C-atom to which they are attached form a 5 to 7 membered saturated ring, provided that only one of $R_{10}$, $R_{11}$, $R_{12}$ is hydrogen; for example $R_{10}$, $R_{11}$, $R_{12}$ independently of one another are hydrogen, linear or branched $C_1$-$C_{12}$alkyl, or phenyl, provided that only one of $R_{10}$, $R_{11}$, $R_{12}$ is hydrogen; for example $R_{10}$ is hydrogen and $R_{11}$ and $R_{12}$ are $C_1$-$C_4$alkyl, in particular methyl; preferably $R_{10}$, $R_{11}$, $R_{12}$ are $C_1$-$C_4$alkyl, in particular methyl.

$R_{13}$, $R_{14}$, $R_{15}$, independently of one another are hydrogen, linear or branched $C_1$-$C_{20}$alkyl, $C_6$-$C_{14}$aryl or halogen, or $R_{13}$ and $R_{14}$ together with the C-atom to which they are attached form a 5 to 7 membered saturated ring, provided that only one of $R_{13}$, $R_{14}$, $R_{15}$ is hydrogen; for example $R_{13}$, $R_{14}$, $R_{15}$ independently of one another are hydrogen, linear or branched $C_1$-$C_{12}$alkyl, or phenyl, provided that only one of $R_{13}$, $R_{14}$, $R_{15}$ is hydrogen; for example $R_{13}$ is hydrogen and $R_{14}$ and $R_{15}$ are $C_1$-$C_4$alkyl, in particular methyl; preferably $R_{13}$, $R_{14}$, $R_{15}$ are $C_1$-$C_4$alkyl, in particular methyl.

$R_{16}$, $R_{17}$, $R_{18}$, independently of one another are hydrogen, linear or branched $C_1$-$C_{20}$alkyl, $C_6$-$C_{14}$aryl or halogen, or $R_{16}$ and $R_{17}$ together with the C-atom to which they are attached form a 5 to 7 membered saturated ring, provided that only one of $R_{16}$, $R_{17}$, $R_{18}$ is hydrogen; for example $R_{16}$, $R_{17}$, $R_{18}$ independently of one another are hydrogen, linear or branched $C_1$-$C_{12}$alkyl, or phenyl, provided that only one of $R_{16}$, $R_{17}$, $R_{18}$ is hydrogen; for example $R_{16}$ is hydrogen and $R_{17}$ and $R_{18}$ are $C_1$-$C_4$alkyl, in particular methyl; preferably $R_{16}$, $R_{17}$, $R_{18}$ are $C_1$-$C_4$alkyl, in particular methyl.

$R_{19}$, $R_{20}$ and $R_{21}$ independently of one another are hydrogen, linear or branched $C_1$-$C_{20}$alkyl, $C_6$-$C_{14}$aryl or halogen, or $R_{19}$ and $R_{20}$ together with the C-atom to which they are attached form a 5 to 7 membered saturated ring, provided that only one of $R_{19}$, $R_{20}$, $R_{21}$ is hydrogen; for example $R_{19}$, $R_{20}$, $R_{21}$ independently of one another are hydrogen, linear or branched $C_1$-$C_{12}$alkyl, or phenyl, provided that only one of $R_{19}$, $R_{20}$, $R_{21}$ is hydrogen; for example $R_{19}$ is hydrogen and $R_{20}$ and $R_{21}$ are $C_1$-$C_4$alkyl, in particular methyl; preferably $R_{19}$, $R_{20}$, $R_{21}$ are $C_1$-$C_4$alkyl, in particular methyl.

The compounds of the present invention can be prepared by known methods, e.g. by ligand exchange reactions from specific known Ti-chelate compounds, as for example described in WO2009/050115

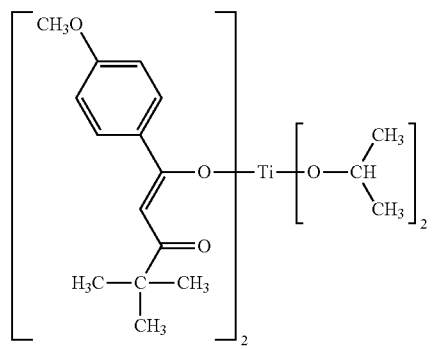

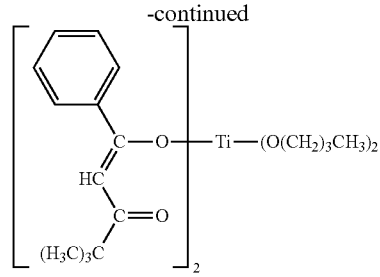

(see examples 57 and 55 of WO2009/050115) or the compound A (preparation see below in the specific examples).

The compounds according to the present invention are prepared from these compounds (or similar compounds with the corresponding substituents) by reacting them with the appropriate phenols or chelating difunctional alcohols. The ligand exchange reaction takes place spontaneously or the lower alcohol is removed azeotropically and replaced by the phenol, or chelating difunctional alcohol. The person skilled in the art is familiar with such reactions and the conditions therefor.

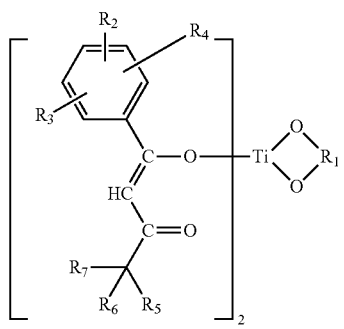

The definitions of $R_1$, $R_2$, $R_3$, $R_4$, $R_5$, $R_6$ and $R_7$ are given as above.

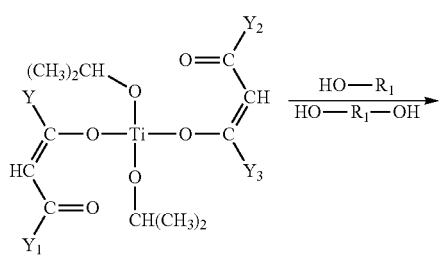

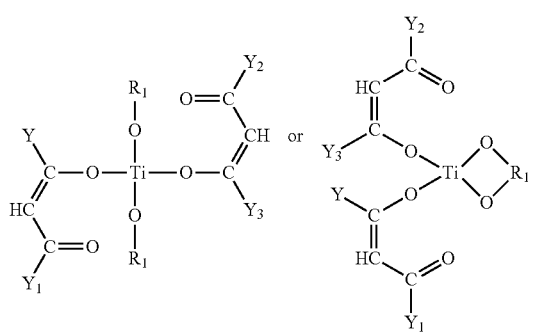

The definitions of $R_1$, Y, $Y_1$, $Y_2$, $Y_3$ and X are given as above.

The compounds of the present invention may also be prepared by a one pot process from titanium tetrachloride or titanium teraalkoxyde according to the scheme

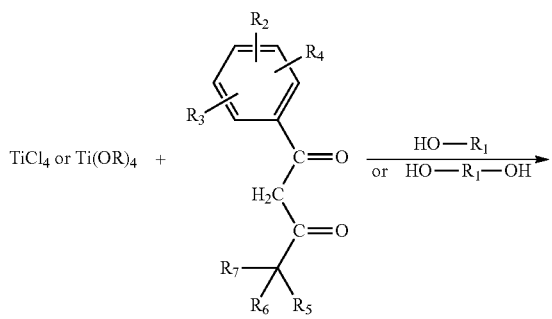

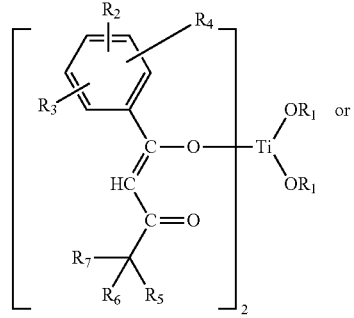

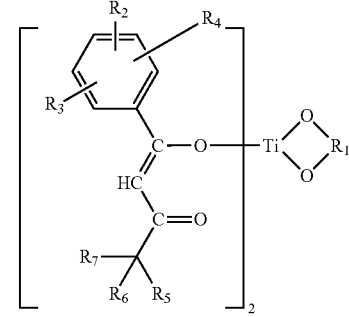

The person skilled in the art is familiar with conditions and precautions which have to be taken in such organometallic reactions.

It is, for example, advantageous to work under an inert reaction atmosphere as in principle the organometallic intermediates (metal alkoxides, metal enolates, etc.) are very sensitive to moisture. Accordingly, the reaction advantageously is conducted under nitrogen or argon gas flow by advantageously inertizing the corresponding reaction apparatus prior to the reaction by the usual methods, for example by heating followed by evacuation.

In the isolation and working-up of the products of the present invention, it is also necessary to take corresponding appropriate precautions, depending on the stability against moisture and oxygen.

Suitable solvents in the preparation processes for the compounds according to the present invention are for example water free aprotic solvents, in particular toluene, xylene, hexane, cyclohexane, dichloromethane, dioxane and tetrahydrofurane (THF) or water free alcohols, in particular methanol, ethanol, propanol, butanol or isopropyl alcohol. The reaction may also be carried out without using a solvent.

The reaction temperature range for example from 0° C. to up to about 200° C., or room temperature (e.g. 20° C.) to 150° C., preferably room temperature to 100° C.

The pressure for example ranges from normal pressure (760 Torr) to 1 mmHg, preferably a slight vacuum or normal pressure is used.

Several compounds, that may be used as intermediates in the above reactions are commercially available, e.g. Ti-complexes, or are prepared for example as described in WO2009/050115 mentioned above.

The compounds IIa, IIb and IIc (which describe tautomeric forms of one compound) of this invention are commercially available or can be prepared by Claisen condensation of the respective esters or activated carboxylic acids and methylketones, a reaction well known to those skilled in the art. Alternatively they can be prepared by rearrangement of epoxyketones as described by R. Noyori et al. In J. Am. Chem. Soc. 1980, 102, 2095.

Ti-chelate catalyst formulation, comprising compounds of the formula IA and compounds of the formula IIa, IIb and IIc is for example formed using different approaches:

i) dissolving a photo-latent catalyst of the formula IA in a solvent or part of the formulation to be crosslinked and adding the 1,3-diketone compound of the formula IIa, IIb and IIc to either this solution or to another part of the formulation (or in inverse order);

ii) preparing the Ti-chelate catalyst formulation in advance as a physical mixture of a photo-latent catalyst of the formula IA and the 1,3-diketone compound of the formula IIa, IIb and IIc, optionally as a solution in an organic solvent, eg. xylene or butylacetate, which can be stored (the mixture may be prepared by mixing of the compound of the formula IA with the 1,3-diketone, or by addition of the 1,3-diketone during the preparation of the compound of the formula IA).

Suitable examples for compounds of the formula IIa, IIb and IIc are for example but not limited to

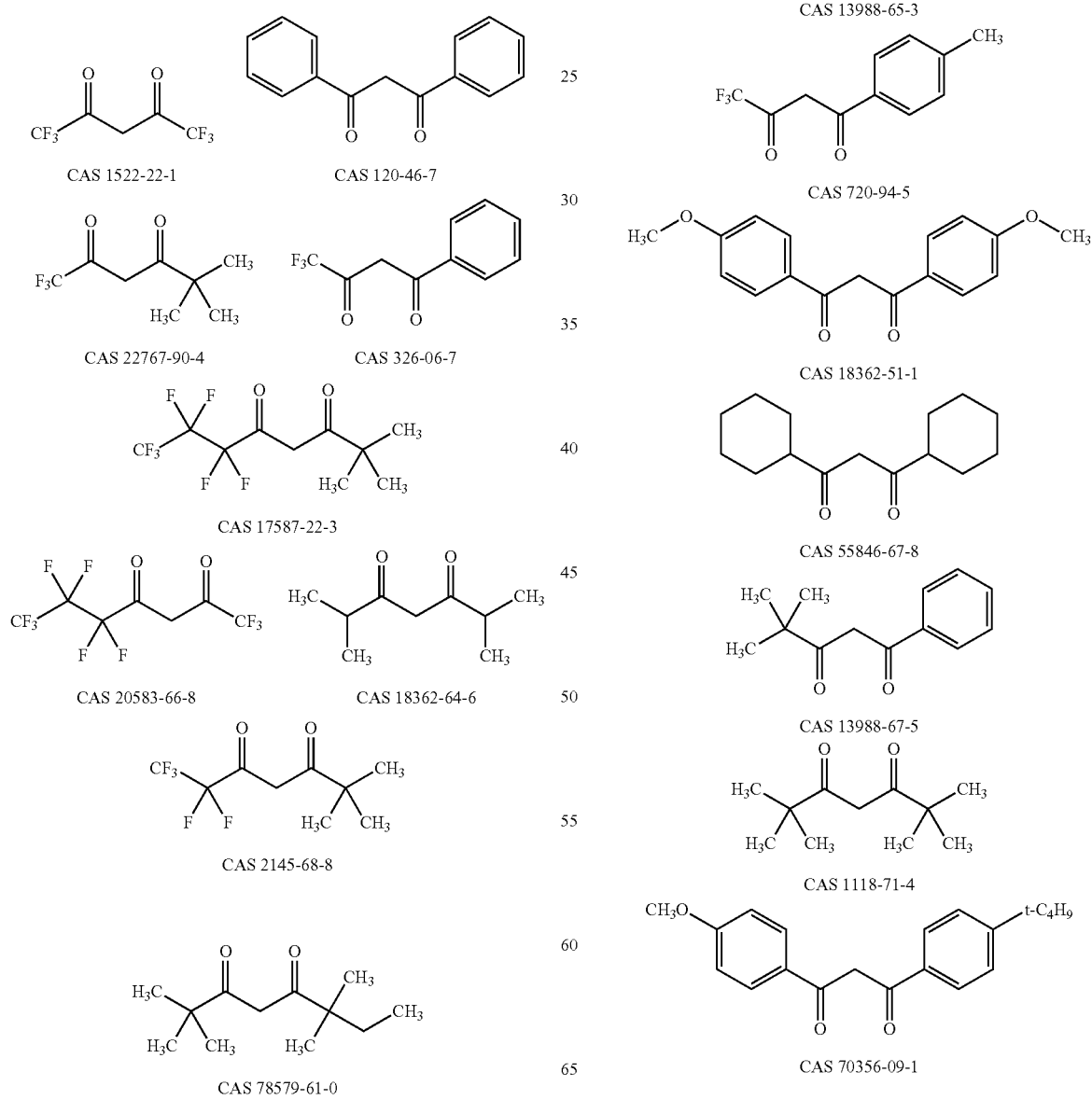

Ti-chelate catalyst formulations for example comprise 1-50% (w/w) of the 1,3-diketone of the formula IIa, IIb or IIc [that is the component (ii)] and 99-50% (w/w) of the compound of the formula I [that is the component (i)]. Ti-chelate catalyst formulations preferably comprise 2-35% (w/w) of the 1,3-diketone of the formula IIa, IIb or IIc [that is the component (ii)] and 98-65% (w/w) of the compound of the formula I [that is the component (i)], in particular 5-30% of the 1,3-diketone of the formula IIa, IIb or IIc [that is the component (ii)] and 95-70% (w/w) of the compound of the formula I [that is the component (i)].

The present compositions, and the process for making them crosslinked, are useful as encapsulants, sealants, adhesives, foams, printing plates and coatings, especially transportation (automotive) and industrial coatings. As transportation coatings, the present compositions are useful as both OEM (original equipment manufacturer) and automotive refinish coatings. They may also be used as primer coatings. They often cure under ambient conditions to tough hard coatings and may be used as base coat, intermediate coating and top coat, either clear or pigmented. This makes them particularly useful for repainting of transportation vehicles in the field.

This invention provides (photo)latent compounds as catalysts for polyaddition or polycondensation reactions, that are catalysed by Lewis-acid type reactants. Especially preferred is the reaction of polyols with isocyanates.

Accordingly, subject of the invention also is the use of a Ti-chelate catalyst compound as described above or the Ti-chelate catalyst formulation as described above as a catalyst for polyaddition or polycondensation reactions, that are catalysed by Lewis-acid type reactants, in particular for the crosslinking of a blocked or unblocked isocyanate or isothiocyanate component with a polyol to form a polyurethane (PU); as well as a polymerizable composition comprising (a) at least one blocked or unblocked isocyanate or isothiocyanate, (b) at least one polyol; and (c1) at least one Ti-chelate catalyst compound as described above, or (c2) at least one Ti-chelate catalyst formulation as described above.

Said polymerizable composition in addition to components (a), (b) and (c1) or (c2) can comprise further additives (d), in particular a photosensitizer compound.

The photopolymerizable compositions generally comprise 0.001 to 15% by weight, e.g. 0.05 to 15% by weight, preferably 0.01 to 5% by weight, most preferably 0.05 to 2.5%, of the Ti-chelate catalyst compound as defined above or of the Ti-chelate catalyst compound of the formula IA in the formulation as defined above, based on the total composition. In other words, the amount as defined above refers to the active catalyst compound, excluding the compounds of the formula IIa, IIb and IIcm which are present in the Ti-chelate catalyst formulation as defined above. The amounts are based on the total weight of the composition.

The use of a Ti chelate catalyst for crosslinking of moisture curing silicone elastomers is e.g. described by J.-M. Pujol and C. Prébet in J. Adhesion Sci. Technol. 2003, 17, 261. Curing by crosslinking of silicone compositions is used in many applications such as waterproofing seals in construction (G. M. Lucas in WO02/062893 or T. Detemmerman et al in WO2008/045395), adhesives in structural glazing, gaskets in car engines, adhesives for electronic devices, and antifouling or moisture repellent coatings (H. Kobayashi et al in WO02/098983). Ti chelates can also be used for room-temperature curable organopolysiloxane compositions used e.g. as sealants or coating agents for electric circuits and electrodes (A. Nabeta et al in WO2009/054279), for curing of pressure sensitive adhesives as described by K. Fujimoto and K. Ueda in EP1715015, or for curing of an adhesive composition based on silane and phenolic resin (S. Sano et al in EP1842889). They can also be used for curing of non silicone rubber compositions as described e.g. by T. W. Wilson in WO02/100937. Ti chelate catalysts can also be used for curing of epoxy resins (W. J. Blank et al in Journal of Coatings Technology 2002, 74, 33), e.g. for anhydride epoxy resins as described by J. D. B. Smith in J. Applied Polym. Sci. 1981, 26, 979, or carboxyl epoxy resins used for heat activatable adhesive tapes (T. Krawinkel in WO2008/043660).

Other examples of metal catalyzed crosslinking reactions are for example the reaction of siloxane-terminated oligomers with epoxides used in the fabrication of abrasion and weather resistant coatings (M. Priesch in DE19935471), the reaction of epoxy resins with hydroxyl-terminated poly(dimethyloxysilanes) and an aminopropyltriethoxysilane crosslinker (M. Alagar et al. Eur. Polym. J. 2000, 36, 2449), or the reaction of polyethers terminated by hydrolysable silyl groups with epoxy silanes and ketimines (Y. Murayama, JP06049346) or oximo-ethoxy functional sealants as described by H. M. Haugsby et al in EP399682. The use of room temperature vulcanizing (RTV) siloxane rubbers for biofouling protection is reported by J. M. Delehanty et al, GB2444255. Sol-gel reactions catalysed by a metal catalyst are for example described by J. Mendez-Vivar, J. of Sol-Gel Sci. Technol. 2006, 38(2), 159.

Another subject of the invention is a process for polymerizing compounds, which are capable to crosslink in the presence of a Lewis acid, characterized in that a compound according to the invention or a formulation according to the invention is added to said compounds and the resulting mixture is irradiated with electromagnetic radiation of a wavelength range of 200-800 nm; in particular a process wherein the component which is capable to crosslink in the presence of a Lewis acid is a mixture of (a) a blocked or unblocked isocyanate or isothiocyanate component and (b) a polyol.

Interesting further is a process as defined above, characterized in that instead of irradiating with electromagnetic radiation the mixture is subjected to a heat treatment, or the mixture is irradiated with electromagnetic radiation and simultaneously with or after the irradiation subjected to a heat treatment Further subjects of the invention are a process as described above for the preparation of adhesives, coatings, sealings, potting components, printing inks, printing plates, foams, moulding compounds, or photostructured layers, as well as the use of the polymerizable composition as described above for the preparation of adhesives, coatings, sealings, potting components, printing inks, printing plates, foams, moulding compounds, or photostructured layers.

Another subject is a coated substrate coated on at least one surface with a composition as described above and a polymerized or crosslinked composition as described above.

Polyols (component (b)) are generally defined as polymeric or oligomeric organic species with at least two hydroxy functionalities.

Examples of suitable polyols include trimethylol propane, trimethylol ethane, glycerol, 1,2,6-hexanetriol, ethylene glycol, 1,2-propylene glycol, 1,3-propylene glycol, 2-methyl-propane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, etc., and mixtures thereof.

Suitable polyols also include the more recently developed hyperbranched OH-polymers.

The hydroxyl-functional compound comprising at least two hydroxyl-functional groups may for example also be selected from polyester polyols, polyether polyols, e.g. poly-THF-poylol, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, e.g. HO-functional vinyl oligomers, such as castor oil and trimethylol propane, may be included. Interesting polyols are acrylic and polyester polyols, e.g. the Joncryl® acrylic polyols available from BASF (e.g. Joncryl® 512 or 922), or Setalux® and Setal® products available from Nuplex Resins (e.g. Setalux® 1187 XX-60, Setal® 1606 BA-80), or Desmophen® products from Bayer Material Science (e.g. Desmophen® A VP LS 2350).

In the context of the present invention also polyol components which are suitable in water-borne system such as e.g. waterborne 2K polyurethane, can be employed. Such polyol components are commercially available, for example from BASF under the trademark Joncryl®, e.g. Joncryl® 8311, and also the trademark Luhydran®, e.g. Luhydran® 5938T, as well as from Bayer Material Science under the trademark BAYHYDROL®, eg. BAYHYDROL® XP2470.

Suitable isocyanate components (a) are for example isocyanates—with functional groups capable of reacting with hydroxyl—and are structured as follows: [O=C=N$-$]$_{p>2}$R$_{70}$, wherein R$_{70}$ is a hydrocarbyl structure.

The organic (poly)isocyanate includes for example polyfunctional, preferably free poly-isocyanates, with, for instance, an average NCO functionality of 2.5 to 5, and may be aliphatic, cycloaliphatic, araliphatic or aromatic in nature. Examples are di-, tri- or tetra-isocyanates. The polyisocyanate may include biuret, urethane, uretdione, and isocyanurate derivatives. Suitable polyisocyanates include polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanates, etc.

Examples of these organic polyisocyanates include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl)methane, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylen diisocyanate, 1,4-xylylen diisocyanate, 1-isocyanato-3-(isocyanato methyl)-1-methyl cyclohexane, m-α,α-α',α'-tetramethyl xylylene diisocyanate, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane-4,4'-diisocyanate, a toluene diisocyanate, 1,3-bis(1-isocyanato-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethypenzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, the above-mentioned derivatives thereof, and mixtures thereof. Further examples are polyisocyanates having isocyanurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (e.g. as available under the trademark Desmodur®N from Bayer Corporation), the adduct of 1 molecule of trimethylol propane and 3 molecules of toluene diisocyanate (available under the trademark Desmodur®L from Bayer Corporation), the adduct of 1 molecule of trimethylol propane and 3 molecules of isophorone diisocyanate, compounds such as 1,3,5-triisocyanatobenzene and 2,4,6-triisocyanatotoluene, and the adduct of 1 molecule of pentaerythritol and 4 molecules of toluene diisocyanate.

A specific example of an isocyanate capable of reacting with hydroxyl groups is the HDI trimer, e.g. Desmodur® 3300 available from Bayer, or Basonat® HI 100 available from BASF. The idealized structure of the latter is given as follows (also, pentamer, heptamer and higher molecular weight species can be present):

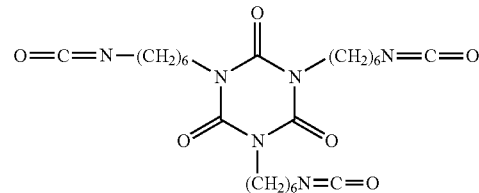

Normally, these products are liquid at ambient temperature and commercially available in a wide range. Particularly preferred isocyanate curing agents are triisocyanates and adducts. Examples thereof are 1,8-diisocyanato-4-(isocyanatomethyl)octane, the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the adduct of 3 moles of m-α,α-α',α'-tetramethyl xylene diisocyanate to 1 mole of trimethylol propane, and mixtures thereof.

In particular interesting are cyclic trimers (isocyanurates) and uretdiones of 1,6-hexane diisocyanate and isophorone diisocyanate. Usually these compounds contain small quantities of their higher homologues.

Optionally, in case the present composition is used as a water borne coating composition, it may also comprise an organic hydrophilic polyisocyanate compound substituted with non-ionic groups, such as $C_1$-$C_4$alkoxy polyalkylene oxide groups. For example 30 wt. % of non-ionic groups will be present on the total solid polyisocyanate compound, e.g. 20 wt. %, preferably 15 wt. %. Ionically stabilized polyisocyanates may also be used.

In any of the compositions herein, the polymeric materials may range from relatively low to relatively high molecular weight. It is preferred that they be of relatively low molecular weight so as to keep the viscosity of the compositions before crosslinking low, so as to avoid or minimize the need for solvent(s).

Other additives (d), which may optionally be present in the compositions include one or more solvents (and are meant to act only as solvents). These preferably do not contain groups such as hydroxyl or primary or secondary amino.

Depending on use, the compositions may contain other materials (d). Examples of ingredients, additives or auxiliaries (d), are pigments, dyes, emulsifiers (surfactants), pigment dispersion aids, levelling agents, anti-cratering agents, antifoaming agents, wetting agents, antisagging agents, heat stabilisers, UV absorbers, antioxidants, desiccants and fillers.

For example, especially when used as encapsulants and sealants, the compositions may contain fillers, pigments, and/or antioxidants.

When used as coatings, the present compositions optionally contain typically added ingredients known in the art, which are described below. For example there may be other polymers (e) (especially of low molecular weight, "functionalized oligomers") which are either inert or have a functional group other than hydroxyl or isocyanate and also react with other reactive materials in the coating composition.

Representative examples of such functionalized oligomers that can be employed as components or potential crosslinking agents of the coatings are the following:

Hydroxyl oligomers: for example the reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like produce acid oligomers. These acid oligomers are further reacted with monofunctional epoxies such as butylene oxide, propylene oxide, and the like to form hydroxyl oligomers.

Silane oligomers: for example the above hydroxyl oligomers further reacted with isocyanato propyltrimethoxy silane.

Epoxy oligomers: for example the diglycidyl ester of cyclohexane dicarboxylic acid, such as for example Araldite®CY-184 from Huntsman, and cycloaliphatic epoxies, such as for example Celloxide 2021 and the like from Daicel, or for example hydroxyl-terminated epoxidized polybutadiene, e.g. Poly bd 600 and 605 from Sartomer. Also suitable as reactive materials are for example oxetane derivatives, e.g. OXT 101 and 121 from Toagosei or TMPO from Perstorp.

Aldimine oligomers: for example the reaction product of isobutyraldehyde with diamines such as isophorone diamine, and the like.

Ketimine oligomers: for example the reaction product of methyl isobutyl ketone with diamines such as isophorone diamine.

Melamine oligomers: for example the commercially available melamines such as CYMEL® 1168 from Cytec Industries, and the like.

AB-functionalized oligomers: for example acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-functionalized crosslinkers: for example epoxy/hydroxyl functional crosslinkers such as the polyglycidyl ether of Sorbitol DCE-358® from Dixie Chemical or blends of the hydroxyl oligomers and epoxy crosslinkers mentioned above or any other blend as depicted above.

Preferred functionalized oligomers have for example a weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydispersity not exceeding about 1.25.

Other additives for example also include polyaspartic esters, which are the reaction product of diamines, such as, isoperone diamine with dialkyl maleates, such as, diethyl maleate.

Optionally, a hydroxyl-functional compound comprising at least two hydroxyl-functional groups may be present in the curable material. The hydroxyl-functional compound comprising at least two hydroxyl-functional groups may for example be selected from polyester polyols, polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylol propane, may be included. Interesting polyols are acrylate polyols, e.g. the acrylate polyol Setalux®1187 available from Nuplex Resins.

Coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate and the like.

The compositions of this invention may additionally contain a binder (e) of a noncyclic oligomer, i.e., one that is linear or aromatic. Such noncyclic oligomers can include, for instance, succinic anhydride- or phthalic anhydride-derived moieties in hydroxyl oligomers and the like.

The compositions of the invention as coating compositions can for example also contain as a binder an acrylic polymer of a weight average molecular weight greater than 3,000, or a conventional polyester such as SCD®-1040 from Etna Product Inc. for improved appearance, sag resistance, flow and leveling and the like. The acrylic polymer is for example composed of typical monomers such as acrylates, methacrylates, styrene and the like and functional monomers such as hydroxy ethyl acrylate, glycidyl methacrylate, or gamma-methacrylylpropyl trimethoxysilane and the like.

The coating compositions for example can also contain a binder (e) of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 μm. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is for example comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

Optionally, for example a ketone based chelating agent (as further additive (d)) may be added to the coating composition. Examples of these chelating agents include alpha-hydroxyl ketones, fused aromatic beta-hydroxy ketones, dialkyl malonates, aceto acetic esters, aceto acetic amides, alkyl lactates, and alkyl pyruvates. The ketone based chelating agent for example is used in an amount up to 10 wt. % on solids, preferably up to 5 wt. %.

In one embodiment the coating composition additionally comprises a pot life extending agent. A pot life extending agent is particularly beneficial when the photolatent catalyst exhibits a certain degree of catalytic activity also in the latent form. It may also be the case that the photolatent catalyst contains catalytically active impurities which deteriorate the pot life of the composition. Pot life extending agents increase the pot life of the coating composition, i.e. the time between the mixing of all components and the moment when the viscosity becomes too high for the composition to be applied. Pot life extending agents can suitably be present in similar amounts as the photolatent catalysts mentioned above. Preferred pot life extending agents have only a limited or no negative impact on the drying speed of the coating composition, in particular when curing the applied coating at elevated temperature, such as 40 to 60° C. Thus, these pot life extending agents improve the balance of pot life and drying speed. The pot life extending agent can also have a beneficial effect on the appearance of the coating. Examples of suitable pot life extending agents are carboxylic acid group-containing compounds, such as acetic acid, propionic acid or pentanoic acid. Aromatic carboxylic acid group-containing compounds are preferred, in particular benzoic acid. Other suitable pot life extending agents are phenolic compounds, tertiary alcohols such as tertiary butanol and tertiary amyl alcohol, and thiol group-containing compounds. It is also possible to use a combination of the above-mentioned pot life extending agents, such as a combination of an aromatic carboxylic acid group-containing compound and a thiol group-containing compound or a mercapto carboxylic acid.

The composition according to the present invention may be a water-borne composition, a solvent borne composition or a solvent-free composition. Since the composition may be composed of liquid oligomers, it is especially suitable for use as a high solids composition or a solvent-free composition. Alternatively, the coating composition of the present invention is an aqueous powder coating dispersion wherein the isocyanate reactive compound has a Tg above 20° C. The coating composition may as well be used in powder coating compositions and hot melt coatings compositions. For example the theoretical volatile organic content (VOC) in the composition is less than about 450 g/l, e.g. less than about 350 g/l, or less than about 250 g/l.

The compositions of the invention, in particular as coating compositions, can for example also contain conventional additives such as pigments, stabilizers, rheology control agents, flow agents, toughening agents and fillers. Such additional additives will, of course, depend on the intended use of the (coating) composition.

The compositions according to the invention are typically applied to a substrate by conventional techniques such as spraying, electrostatic spraying, roller coating, curtain coating, dipping or brushing. The present formulations are for example useful as a clear coating for outdoor articles, such as automobile and other vehicle body parts. The substrate optionally is for example prepared with a primer and or a color coat or other surface preparation prior to coating with the present compositions.

A layer of a coating composition is for example cured under ambient conditions in the range of a few minutes to 24 hours, typically in less than 8 hours, preferably in the range of 5 minutes to 3 hours, (depending on the type of radiation source), after activating the latent catalyst e.g. by exposure to UV-light, to form a coating on the substrate having the desired coating properties. One of skill in the art appreciates that the actual curing time depends upon several parameters, including thickness, latent catalyst concentration, ingredients in the formulation; and it depends also upon any additional mechanical aids, such as, for example fans that assist in continuously flowing air over the coated substrate to accelerate the cure rate. If desired, the cure rate may be further accelerated by heating the coated substrate at temperatures generally in the range of from about 60° C. to 150° C. for a period of for example about 15 to 90 minutes. The heating is for example performed by heating in an oven, by subjecting the samples to hot air, by IR-exposure, by microwaves or any other suitable means known in the art. The foregoing heating step is particularly useful under OEM (Original Equipment Manufacture) conditions. The cure time may also depend on other parameters such as for example the humidity of the atmosphere.

The latent catalysts of this invention can for example be used for coating applications and generally in areas where curing of polyurethane is required. For example, the compositions are suitable as clear or pigmented coatings in industrial and maintenance coating applications.

The compositions according to the invention are also suitable for use in uv-curing adhesives, e.g. in the preparation of pressure-sensitive adhesives, laminating adhesives, hot-melt adhesives, moisture-cure adhesives, silane reactive adhesives or silane reactive sealants and the like, and related applications.

Said adhesives can be hot melt adhesives as well waterborne or solvent borne adhesives, liquid solventless adhesives or 2-part reactive adhesives. In particular suitable are pressure-sensitive adhesives (PSA), for example uv-curable hot melt pressure sensitive adhesives. Said adhesives for example comprise at least one rubber component, at least one resin component as tackyfier and at least one oil component, for example in the weight ratio 30:50:20. Suitable tackyfiers are natural or synthetic resins. The person skilled in the art is aware of suitable corresponding compounds as well as of suitable oil components or rubbers.

The pre-polymerized adhesives containing the isocyanates, for example in blocked form, can for example be processed at high temperature and coated onto the substrate following the hotmelt process, afterwards full cure is achieved by an additional curing step involving the blocked isocyanates, which is realized by photoactivation of the photolatent catalyst.

Hotmelt adhesives are interesting as pressure sensitive adhesives and suitable to replace the use of solvent base compositions, which from an environmental point of view are unwanted. The hotmelt extrusion process in order to achieve the high flow viscosity necessitates high application temperatures. The compositions of the present invention comprising isocyanates are suitable as crosslinkers in the preparation of a hotmelt coating, where the crosslinkers enter into a chemical reaction with the functional comonomers of the (meth)acrylate PSA. After the coating operation, the PSAs are first crosslinked thermally, or implementing the dual crosslinking mechanism, the PSA is subsequently crosslinked with UV light. UV crosslinking irradiation takes place by means of shortwave ultraviolet radiation in a wavelength range from 200 to 400 nm, even expanding in the visible range, e.g. up to 650 nm, depending on the source of the UV radiation equipment, as well as on the photolatent metal catalyst. Such systems and processes are for example described in US 2006/0052472, the disclosure of which hereby is incorporated by reference.

The composition of the present invention is suitable for application on a variety of substrates, e.g. it is especially suitable for providing clear coatings in automotive OEM (Original Equipment Manufacture) or refinish applications typically used in coating car bodies. The coating composition of the present invention can for example be formulated in the form of a clear coating composition, pigmented composition, metallized coating composition, basecoat composition, monocoat composition or a primer. The substrate is for example prepared with a primer and or a color coat or other surface preparation prior to coating with the present compositions.

Suitable substrates for applying the coating composition of the present invention include automobile bodies (or vehicle bodies in general), any and all items manufactured and painted by automobile sub-suppliers, frame rails, commercial trucks and truck bodies, including but not limited to for example beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft.

The substrate further includes industrial and commercial new construction and maintenance thereof; cement and wood floors; walls of commercial and residential structures, such as for example office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; golf balls; and sporting equipment.

However, the composition of the present invention may also generally be applied on substrates like for example plastics, metals, glass, ceramics, etc. e.g. in it's function as an adhesive (but not limited thereto).

As the isocyanate to be crosslinked with the latent catalyst of the present invention also blocked isocyanates may be used. Said compounds are for example "deblocked" prior to the use in the composition, or may be deblocked during the reaction, or may take part in the reaction in the blocked form, e.g. in the course of the "activation" of the latent catalyst by heat or irradiation.

Blocked isocyanates are known in the art and for example described in a review article by D. A. Wicks, Z. W. Wicks in Progress in Organic Coatings, 41 (2001), 1-83, as well as by C. Gürtler, M. Homann, M. Mager, M. Schelhaas, T. Stingl, Farbe+Lack 2004, 110(12), 34; both documents incorporated herein by reference.

Suitable isocyanate components are for example as given above.

Suitable blocking agents for the isocyanates are the ones known in the art, for example alcohols, phenols, amines, imides, amides, guanidines, amidines, triazoles, pyrazoles, active methylene compounds, ketoximes, oximes, malonesters, alkylacetoacetates, formiates, lactams, imidazoles, triazoles, pyrazoles, CH-acidic cyclic ketones and mercaptans.

Examples are aliphatic, cycloaliphatic, aromatic, or alkyl monoalcohol or phenolic compounds such as, for example, lower aliphatic alcohols including methyl, ethyl, chloroethyl, propyl, butyl, amyl, hexyl, heptyl, octyl, nonyl, decyl and lauryl alcohols, 3,3,5-trimethylhexanol and the like. The aromatic-alkyl alcohols include for example phenylcarbinol and ethylphenylcarbinol. Glycol ethers may be employed such as ethyl glycol monoethyl ether, ethyl glycol monobutyl ether and equivalents thereof. Examples of phenolic compounds which may be employed comprise phenol, substituted phenols such as cresol, xylenol, nitrophenol, chlorophenol, ethyl phenol, t-butyl phenol and 2,5-di-t-butyl-4-hydroxy toluene.

Examples of other blocking agents that may be employed include tertiary hydroxyl amines such as diethylethanolamin, lactams such as caprolactam and oximes such as methyl ethyl ketone oxime, acetone oxime and cyclohexanone oxime.

Specific examples are butanonoxime, diisoproylamine, 1,2,4-triazole, dimethyl-1,2,4-triazole, imidazole, ethylates of malonic and acetic acid, acetoneoxime, 3,5-dimethylpyrazole, epsilon-caprolactame, N-methyl-, N-ethyl, N-(iso)propyl, N-n-butyl, N-iso-butyl-, N-tert.-butylbenzylamine or, 1,1-dimethylbenzylamine, N-alkyl-N-1,1-dimethylmethylphenylamine; adducts of benzylamine and compounds with activated double bonds, such as malonic acid esters, N,N-dimethylaminopropylbenzylamine and other compounds comprising tertiary amine groups, where appropriate substituted benzylamines and/or dibenzylamine.

Use of the oximes and phenols in some instances is desirable because some specific polyisocyanates blocked with these oximes or phenols uncap at relatively low temperatures.

Examples of suitable CH-acidic ketones are given in WO 04/058849 and incorporated herein by reference. Preferred are cyclopentanon-2-carboxymethylester, cyclopentanon-2-carboxyethylester, cyclopentanon-2-carboxynitrile, cyclohexanon-2-carboxymethylester, cyclohexanon-2-carboxyethylester, cyclopentanon-2-carbonyl methane, especially cyclopentanon-2-carboxymethylester, cyclopentanon-2-carboxyethylester, cyclohexanon-2-carboxymethylester and cyclohexanon-2-carboxyethylester, in particular cyclopentanon-2-carboxyethylester and cyclohexanon-2-carboxyethylester.

It is evident that also mixtures of different blocking agents may be used and a blocked isocyanate which may be employed in the presently claimed composition may have different blocking groups.

The compositions contain the blocked isocyanate in an amount, for example, of from 5 to 95% by weight, preferably from 20 to 80% by weight, based on the total composition. The ratio isocyanate to polyol for example varies from about 2:1 to 1:2, preferably from 1.2:1 to 1:1.2. The molecular weight MW of the blocked isocyanate for example ranges from about 100 to 50000, especially from 200 to 20000.

In addition to the photolatent catalyst (c) the photopolymerizable composition may include various additives (d).

Subject of the invention also is a polymerizable composition as described above, comprising in addition to components (a), (b) and (c1) or (c2) a further additive (d), in particular a photosensitizer compound.

Additives (d) are for example additional coinitiators or sensitizers which shift or broaden the spectral sensitivity. In general these are aromatic carbonyl compounds, for example benzophenone, thioxanthone, anthraquinone and 3-acylcoumarin derivatives or dyes such as eosine, rhodamine and erythrosine dyes which improve the overall quantum yield by means, for example, of energy transfer or electron transfer. Examples of suitable dyes which can be added as coinitiators are triarylmethanes, for example malachite green, indolines, thiazines, for example methylene blue, xanthones, thioxanthones, oxazines, acridines or phenazines, for example safranine, and rhodamines of the formula

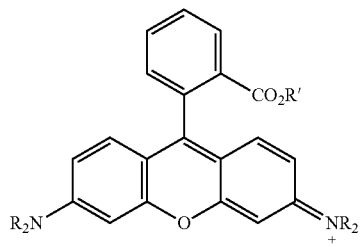

in which R is alkyl or aryl and R' is hydrogen or an alkyl or aryl radical, for example Rhodamine B, Rhodamine 6G or Violamine R, and also Sulforhodamine B or Sulforhodamine G. Likewise suitable are fluorones such as, for example, 5,7-diiodo-3-butoxy-6-fluorone.

In particular interesting as photosensitizers are thioxanthone and thioxanthone derivatives, benzophenone and benzophenone derivatives, coumarine and coumarine derivatives, Further specific examples of photosensitizers suitable as component (d) are 3-(aroylmethylene)-thiazoline and 3-(aroylmethylene)-thiazoline derivatives and rhodanine derivatives.

Specific examples of suitable sensitizers are known to the person skilled in the art and are for example published in WO 06/008251, page 36, line 30 to page 38, line 8, the disclosure of which is hereby incorporated by reference.

Particular preference is given to unsubstituted and substituted benzophenones or thioxanthones. Examples of suitable benzophenones are benzophenone, 4,4'-bis(dimethylamino) benzophenone, 4,4'-bis(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenylbenzophenone, 2-methoxycarbonylbenzophenone, 4-benzoyl-4'-methyl-diphenyl sulfide, 4-methoxy-3,3'-methylbenzophenone, isopropylthioxanthone, chlorothioxanthone, 1-chloro-4-propoxythioxanthone, 2,4-dimethylthioxanthone, 2,4-diethylthioxanthone, 1,3-dimethyl-2-(2-ethylhexyloxy) thioxanthone.

Likewise preferred are mixtures of benzophenones and/or thioxanthones such as, for example, a mixture of benzophenone and 4-methylbenzophenone or of 4-methylbenzophenone and 2,4,6-trimethylbenzophenone.

Within the scope of the present invention also radical-generating photoinitiators such as hydroxyl ketones, amino ketones, mono acylphosphine oxides, bisacylphosphinoxides and oxime esters can be employed as sensitizer.

Further customary additives (d), depending on the intended use, are optical brighteners, fillers, pigments, dyes, wetting agents, levelling assistants, antistatics, flow improvers and adhesion promoters, antioxidants, light stabilizers, e.g. UV-absorbers, for example those of the hydroxybenzotriazole, hydroxyphenyl-benzophenone, oxalamide or hydroxyphenyl-s-triazine type. These compounds can be used individually or in mixtures, with or without sterically hindered amines (HALS).

The compositions may also comprise dyes and/or white and colored pigments. Depending on the kind of application organic as well as anorganic pigments are used. Such additives are known to the person skilled in the art, some examples are titan dioxide pigments, e.g. of the rutile type or anatas type, carbon black, zinc oxide, such as zink white, iron oxide, such as iron oxide yellow, iron oxide red, chromium yellow, chromium green, nickel titanium yellow, ultramarine blue, cobalt blue, bismuth vanadate, cadmium yellow or cadmium red. Examples of organic pigments are mono- or bisazo pigments, as well as metal complexes thereof, phthalocyanine pigments, polycyclic pigments, such as perylene-, anthraquinone-, thioindigo-, chinacridone- or triphenylmethane pigments, as well as diketo-pyrrolo-pyrole-, isoindolinone-, e.g. tetrachlorisoindolinone-, isoindoline-, dioxazin-, benzimidazolone- and chinophthalone pigments.

The pigments are employed alone or in combination in the compositions according to the invention.

Depending on the intended use the pigments are used in amount customary in the art, for example in an amount of 1-60% by weight, or 10-30% by weight, based on the whole formulation.

The compositions may also comprise organic dyes of different classes. Examples are azo dyes, methin dyes, anthraquinone dyes or metal complex dyes. Customary concentrations are for example 0.1-20%, in particular 1-5%, based on the whole formulation.

The choice of additive is made depending on the field of application and on properties required for this field. The additives described above are customary in the art and accordingly are added in amounts which are usual in the respective application.

In some cases it may be advantageous to carry out heating during or after exposure to light. In this way it is possible in many cases to accelerate the crosslinking reaction.

In the above described processes according to the invention, instead of irradiating with electromagnetic radiation the mixture comprising the latent catalyst of the invention can be subjected to a heat treatment. Another possibility, as mentioned above, is to irradiate the reaction mixture with electromagnetic radiation and simultaneously with irradiating or after the irradiation subject it to a heat treatment.

Subject of the invention therefore also is a process as described above, characterized in that instead of irradiating with electromagnetic radiation the mixture is subjected to a heat treatment, or the mixture is irradiated with electromagnetic radiation and simultaneously with or after the irradiation subjected to a heat treatment.

The compositions of the invention can be employed for various purposes, for example as printing inks, as clearcoats, as white paints, for example for wood, plastics or metal, as coatings, inter alia for paper, wood, metal or plastic, as powder coatings, as daylight-curable exterior coatings for marking buildings and roads, for photographic reproduction processes, for holographic recording materials, for image recording processes or for the production of printing plates which can be developed using organic solvents or aqueous-alkaline media, for the production of masks for screen printing, as dental filling materials, as adhesives, including pressure-sensitive adhesives and moisture curing silane modified adhesives, for sealings, as laminating resins, as etch resists or permanent resists and as solder masks for electronic circuits, for potting components, for mouldings, for the production of three-dimensional articles by mass curing (UV curing in transparent moulds) or by the stereolithography process, as is described, for example, in U.S. Pat. No. 4,575,330, for the preparation of composite materials (for example styrenic polyesters, which may contain glass fibres and/or other fibres and other assistants) and other thick-layer compositions, for the coating or encapsulation of electronic components, or as coatings for optical fibres.

In surface coatings, it is common to use mixtures of a prepolymer with polyunsaturated monomers which also contain a monounsaturated monomer. The prepolymer here is primarily responsible for the properties of the coating film, and varying it allows the skilled worker to influence the properties of the cured film. The polyunsaturated monomer functions as a crosslinker, which renders the coating film insoluble. The monounsaturated monomer functions as a reactive diluent, by means of which the viscosity is reduced without the need to use a solvent.

The compositions of the present invention are also suitable for "dual-cure" applications. Dual-cure is meant to be a system which comprises heat-crosslinking components and UV-crosslinking components as well, such as for example a 2K polyurethane (as heatcurable component) and an acrylate component (as the UV-curable component).

Said "dual-cure" compositions are cured by a combination of exposure to radiation and heating, wherein the irradiation and heating are either performed simultaneously or first the irradiation step is performed, followed by heating, or, the composition first is heated, followed by exposure to radiation.

The "dual-cure" compositions generally comprise an initiator compound for the heatcuring component and a photoactive compound according to the present invention for the photocuring step.

The compositions of the invention are suitable, for example, as coating materials for substrates of all kinds, examples being wood, textiles, paper, ceramic, glass, plastics such as polyesters, polycarbonates, polyethylene terephthalate, polyamides, polyolefins or cellulose acetate, especially in the form of films, and also metals such as Al, Cu, Ni, Fe, Zn, Mg or Co and GaAs, Si or $SiO_2$, on which it is the intention to apply a protective coating or, by imagewise exposure, an image.

The substrates can be coated by applying a liquid composition, a solution, dispersion, emulsion or suspension to the substrate. The choice of solvent and the concentration depend predominantly on the type of composition and the coating process. The solvent should be inert: in other words, it should not undergo any chemical reaction with the components and should be capable of being removed again after the coating operation, in the drying process. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

Using known coating processes, the solution is applied uniformly to a substrate, for example by spin coating, dip coating, knife coating, curtain coating, brushing, spraying—especially electrostatic spraying—and reverse roll coating and by electrophoretic deposition. It is also possible to apply the layer to a temporary, flexible support and then to coat the final substrate, for example a copper-clad circuit board, by means of layer transfer via lamination.

The amount applied (layer thickness) and the nature of the substrate (layer support) are functions of the desired field of application. The range of layer thicknesses generally comprises values from about 0.1 µm to several mm, for example 1-2000 µm, preferably 5 to 200 µm, in particular 5 to 60 µm (after evaporation of the solvent).

The compositions according to the invention are also suitable for use in electrodeposition paint or primer: an electrodeposition paint generally consists of a resin containing hydroxyl groups as a base resin and a polyisocyanate compound, optionally blocked with a blocking agent, as a curing agent. The electrodeposition step can be conducted, for example, under the condition of load voltage of 50-400 kV by adjusting usually to 15-35° C. the temperature of the electrodeposition bath comprising the resin composition for electrodeposition paint which has been diluted with deionized water etc. to a solid content concentration of about 5-40% by weight and adjusted pH of the system in the range of 4-9.

The film thickness of the electrodeposition coatings film formable by using the resin composition for electrodeposition paint is not particularly restricted. Preferably it generally is in the range of 10-40 µm based upon a cured film thickness. UV crosslinking irradiation takes place by means of shortwave ultraviolet radiation in a wavelength range from 200 to 650 nm, depending on the UV photoactive moiety in the catalyst according to the present invention and of the used photosensitizer. It is also possible to simultaneously or afterwards submit the electrodeposited paint to a thermal curing step. Examples of such paints are described in US 2005/0131193 and US 2001/0053828, both hereby are incorporated by reference.

The compositions of the present invention are also used to prepare "powder coating compositions" or "powder coatings", either thermal curing or radiation-curable curing ones. By "powder coating compositions" or "powder coatings" is meant the definition as described in "Ullmann's Encyclopedia of Industrial Chemistry, 5th, Completely Revised Edition, Vol. A 18", pages 438 to 444 (1991) in Section 3.4. That is powder coatings are formed by thermoplastic or bakable, crosslinkable polymers, which are applied in powder form to, predominantly metallic, substrates. The way in which the powder is brought into contact with the workpiece that is to be coated typifies the various application techniques, such as electrostatic powder spraying, electrostatic fluidized-bed sintering, fixed bed sintering, fluidized-bed sintering, rotational sintering or centrifugal sintering.

Preferred organic film-forming binders for the powder coating compositions are stoving systems based, for example, on epoxy resins, polyester-hydroxyalkylamides, polyesterglycolurils, epoxy-polyester resins, polyester-triglycidyl isocyanurates, hydroxy-functional polyester-blocked polyisocyanates, hydroxy-functional polyester-uretdiones, acrylate resins with hardener, or mixtures of such resins.

Radiation-curable powder coatings are for example based on solid resins and monomers containing reactive double bonds, for example maleates, vinyl ethers, acrylates, acrylamides and mixtures thereof. A UV-curable powder coating—in admixture with the composition of the present invention—can for example be formulated by mixing unsaturated polyester resins with solid acrylamides (for example methyl methylacrylamidoglycolate), acrylates, methacrylates or vinyl ethers and a free-radical photoinitiator, such formulations being as described, for example, in the paper "Radiation Curing of Powder Coating", Conference Proceedings, Radtech Europe 1993 by M. Wittig and Th. Gohmann. The powder coatings may also comprise binders as are described, for example, in DE 4228514 and in EP 636669.

The powder coatings may additionally comprise white or coloured pigments. For example, preferably rutiletitanium dioxide can be employed in concentrations of up to 50% by weight in order to give a cured powder coating of good hiding power. The procedure normally comprises electrostatic or tribostatic spraying of the powder onto the substrate, for example metal or wood, melting of the powder by heating, and, after a smooth film has formed, radiation-curing of the coating with ultraviolet and/or visible light.

The composition of the present invention for example further may be employed for the preparation of printing inks. Printing inks in general are known to the person skilled in the art, are used widely in the art and are described in the literature. They are, for example, pigmented printing inks and printing inks coloured with dyes.

The radiation-sensitive compositions of the invention can also be subjected to imagewise exposure. In this case they are used as negative resists. They are suitable for electronics (galvanoresists, etch resists and solder resists), for the production of printing plates, such as offset printing plates, flexographic and relief printing plates or screen printing plates, for the production of marking stamps, and can be used for chemical milling or as microresists in the production of integrated circuits. There is a correspondingly wide range of variation in the possible layer supports and in the processing conditions of the coated substrates.

The term "imagewise" exposure relates both to exposure through a photomask containing a predetermined pattern, for example a slide, exposure by a laser beam which is moved under computer control, for example, over the surface of the coated substrate and so generates an image, and irradiation with computer-controlled electron beams.

Following the imagewise exposure of the material and prior to developing, it may be advantageous to carry out a brief thermal treatment, in which only the exposed parts are thermally cured. The temperatures employed are generally 50-150° C. and preferably 80-130° C.; the duration of the thermal treatment is generally between 0.25 and 10 minutes.

A further field of use for photocuring is that of metal coating, for example the surface-coating of metal panels and tubes, cans or bottle tops, and photocuring on polymer coatings, for example of floor or wall coverings based on PVC.

Examples of the photocuring of paper coatings are the colourless varnishing of labels, record sleeves or book covers.

The use of the compositions of the invention for preparing shaped articles made from composite compositions is likewise of interest. The composite composition is made up of a self-supporting matrix material, for example a glass-fibre fabric, or else, for example, of plant fibres [cf. K.-P. Mieck, T. Reussmann in Kunststoffe 85 (1995), 366-370], which is impregnated with the photocuring formulation. Shaped articles which are produced from compositions according to the invention are of high mechanical stability and resistance. The compositions of the invention can also be used in moulding, impregnating and coating compositions, as are described, for example, in EP 007086. Examples of such compositions are fine coating resins on which stringent requirements are placed with respect to their curing activity and resistance to yellowing, or fibre-reinforced mouldings such as planar or longitudinally or transversely corrugated light diffusing panels.

The sensitivity of the novel compositions to radiation generally extends from about 190 nm through the UV region and into the infrared region (about 20,000 nm, in particular 1200 nm), especially from 190 nm to 650 nm (depending on the photoinititator moiety, optionally in combination with a sensitizer as described hereinbefore) and therefore spans a very broad range. Suitable radiation is present, for example, in sunlight or light from artificial light sources. Consequently, a large number of very different types of light sources are employed. Both point sources and arrays ("lamp carpets") are suitable. Examples are carbon arc lamps, xenon arc lamps, medium-, super high-, high- and low-pressure mercury lamps, possibly with metal halide dopes (metal-halogen lamps), microwave-stimulated metal vapour lamps, excimer lamps, super-actinic fluorescent tubes, fluorescent lamps, argon incandescent lamps, electronic flashlights, photographic flood lamps, electron beams and X-rays. The distance between the lamp and the substrate to be exposed in accordance with the invention may vary depending on the intended application and the type and output of lamp, and may be, for example, from 2 cm to 150 cm. Laser light sources, for example excimer lasers, such as krypton F lasers for exposure at 248 nm are also suitable. Lasers in the visible region can also be employed.

Alternatively, the actinic radiation is provided by light emitting diodes (LED) or organic light emitting diodes (OLED), e.g. UV light emitting diodes (UV-LED). Said LEDs allow instant on and off switching of the radiation source. Further, UV-LEDs generally have a narrow wavelength distribution and offer the possibility to customize the peak wavelength and also provide an efficient conversion of electric energy to UV radiation.

As mentioned above, depending on the light source used it is advantageous in many cases to employ a sensitizer, as described above, whose absorption spectrum coincides as closely as possible to the emission spectrum of the radiation source.

The examples which follow illustrate the invention in more detail, without restricting the scope of the invention to said examples only. Parts and percentages are, as in the remainder of the description and in the claims, by weight, unless stated otherwise. Where alkyl radicals having more than three car-

PREPARATION EXAMPLES

Preparation of Catalyst Precursor Compound A

Compound A

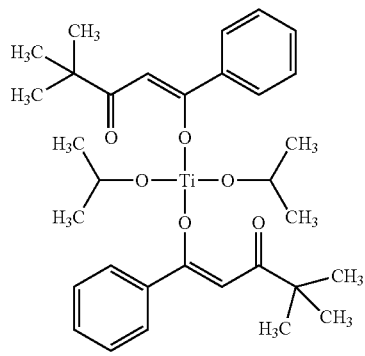

In a 100 ml dry three-neck-flask 17.3 g (61 mmol) Ti(VI) isopropoxide are dissolved in 45 ml dry 2-propanol under argon. 25.0 g (122 mmol) of 4,4-dimethyl-1-phenylpentane-1,3-dione are added slowly in the course of 30 min at room temperature. After 2 h the reaction flask is cooled in an ice-bath and the resulting white precipitate filtered off. The filter cake is washed with 2-propanol and then dried under reduced pressure to give 26.9 g (77%) of the title product as a white solid. The structure is confirmed by $^1$H-NMR spectrum. M.p. 107-109° C.

Example 1

Preparation of

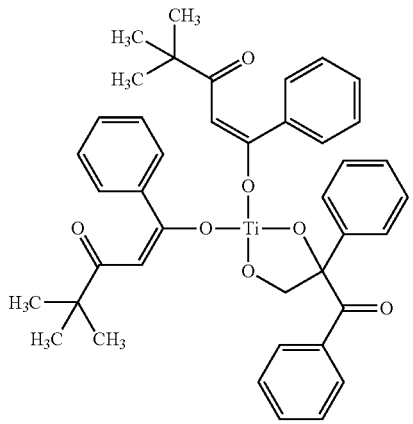

In a 50 ml dry three-neck-flask 1.0 g (1.75 mmol) of compound A are dissolved in 20 ml dry toluene under argon. 0.42 g (1.75 mmol) of 2,3-dihydroxy-1,2-diphenylpropan-1-one [prepared according to H. J. Hageman, Die Makromolekulare Chemie, Rapid Communications (1981), 2(8), 517-521] are added slowly in the course of 15 min at room temperature. The reaction mixture is heated to 60° C. under reduced pressure (80 mbar) during 2 h for azeotropic removal of 2-propanol. The solvent is then completely removed under reduced pressure to give the title compound as a brownish solid. The structure is confirmed by $^1$H-NMR spectrum (CDCl$_3$). δ [ppm]: 1.05-1.26 (br, 18H), 5.31 (d, 1H), 5.94 (d, 1H), 6.54 (br, 2H), 7.37-8.13 (m, 20H).

Examples 2-7

The compounds of examples 2-7 are prepared according to the method as given in example 1 employing the appropriate diols. The compounds and physical data are listed in table 1 below.

TABLE 1

| example | compound | physical data |
|---------|----------|---------------|
| 2 | | Yellowish solid; M.p. 77-80° C. |

TABLE 1-continued

| example | compound | physical data |
|---|---|---|
| 3 | (structure) | Yellowish solid; M.p. 62-65° C. |
| 4 | (structure) | White solid; $^1$H-NMR (CDCl$_3$), δ [ppm]: 0.87-1.30 (br, 24H), 1.58-1.64 (m, 4H), 4.20-4.90 (br, 2H), 6.20-6.42 (br, 2H), 7.30-7.99 (br, 10H). |
| 5 | (structure) | Yellowish solid; $^1$H-NMR (CDCl$_3$), δ [ppm]: 1.10-1.52 (br, 30H); 6.25-6.42 (br, 2H); 7.29-8.03 (br, 10H). |
| 6 | (structure) | Yellowish solid; M.p. 73-77° C. |

TABLE 1-continued

| example | compound | physical data |
|---|---|---|
| 7 | | Orange solid; M.p. 277-281° C. |

Example 8

Preparation of

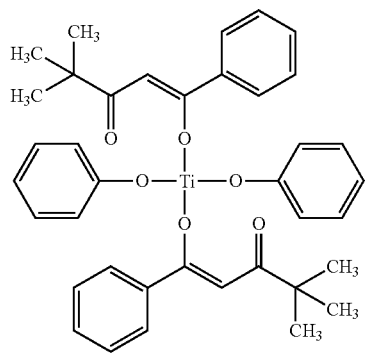

In a 50 ml dry three-neck-flask 1.0 g (1.75 mmol) of compound A are dissolved in 20 ml dry toluene under argon. 0.33 g (3.50 mmol) of phenol are added slowly in the course of 15 min at room temperature. The reaction mixture is heated to 60° C. under reduced pressure (80 mbar) during 2 h for azeotropic removal of 2-propanol. The solvent is then completely removed under reduced pressure to give the title compound as an orange solid. The structure is confirmed by $^1$H-NMR spectra (CDCl$_3$). M.p. 129-131° C.

Examples 9-11

The compounds of examples 9-11 are prepared according to the method as given in example 8 employing the appropriate alcohol and Ti(IV) isopropoxide complex. The compounds and physical data are listed in table 2 below.

TABLE 2

| example | compound | physical data |
|---|---|---|
| 9 | | Red resin; $^1$H-NMR (CDCl$_3$), δ [ppm]: 0.90-1.35 (br, 18H), 2.25 (s, 6H), 6.45 (s, 2H), 6.80-6.98 (br, 8H), 7.23-7.98 (br, 10H). |

TABLE 2-continued

| example | compound | physical data |
|---|---|---|
| 10 | 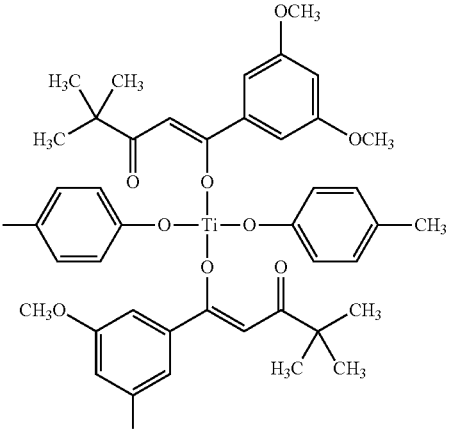 | Red-orange resin; $^1$H-NMR (CDCl$_3$), δ [ppm]: 0.90-1.35 (br, 18H), 2.26 (s, 6H), 3.43-3.86 (br, 12H), 6.34-6.64 (br, 4H), 6.78-7.15 (12H). |
| 11 | 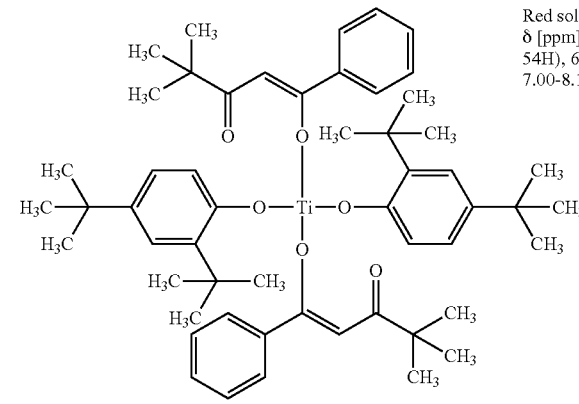 | Red solid; $^1$H-NMR (CDCl$_3$), δ [ppm]: 1.00-1.42 (br, 54H), 6.43-6.50 (br, 2H), 7.00-8.12 (br, 16H). |

APPLICATION EXAMPLES

Pot-Life of a Two Pack Polyurethane System Based on a Polyacrylic Polyol and an Aliphatic Polyisocyanate The polyurethane is the reaction product of two basic components: a polyol (Component A) and a polyisocyanate (Component B). An organometallic photolatent catalyst is added to the total composition of A and B in order to speed up the reaction of A with B.

In the following examples Component A includes all ingredients other than the polyisocyanate. The photolatent catalyst is dissolved carefully into Component A prior to the addition of Component B.

Component A
73.1 parts of a polyol (Desmophen® A VP LS 2350; Bayer AG)
0.9 parts of a flow improver (Byk 355; Byk-Chemie)
0.7 parts of a defoamer (Byk 141; Byk-Chemie)
0.7 parts of a flow improver (Byk 333; Byk-Chemie)
24.6 parts of xylene/methoxypropylacetate/butylacetate (1/1/1)
Component B
Aliphatic polyisocyanate [(HDI-Trimer) Desmodur® N3390 BA; Bayer AG]
The basic testing formulations are composed of:
7.52 parts of component A
2.00 parts of component B

Example A1

The testing samples are prepared by adding 0.1 weight % of metal of the Ti catalyst to the basic testing formulation. After mixing the components A and B together, the visual pot-life of the formulation (time where no change in viscosity is visible), the time to considerable viscosity, and the time to high viscosity are observed.

The catalysts which are used in the test as well as the results of the tests are collected in the following table 1.

TABLE 1

| Catalyst | Visual Pot-life (min.) | Considerably viscous (min.) | Highly viscous (min.) |
|---|---|---|---|
| Without catalyst | >600 | | |
| Compound of example 1 | 60 | 75 | 120 |
| Compound of example 2 | 90 | 120 | 150 |
| Compound of example 8 | 60 | 90 | 120 |
| Compound of example 9 | 50 | 60 | 90 |

TABLE 1-continued

| Catalyst | Visual Pot-life (min.) | Considerably viscous (min.) | Highly viscous (min.) |
|---|---|---|---|
| Compound of example 3 | 50 | 60 | 75 |
| Compound of example 6 | 60 | 80 | 90 |

Example A2

The testing samples are prepared by adding 0.025% weight of metal on solid of the Ti catalyst and 0.125% weight of sensitizer (benzophenone, DAROCUR®) (on solid) to the basic testing formulation.

The mixtures are applied with a 76 μm split coater on two glass plates of 30 cm length. One plate is irradiated using a UV processor from IST Metz (mercury lamps, 2.100 W/cm) at a belt speed of 5 m/min, whereas the second sample is not irradiated.

The reactivity of the mixtures is determined by measuring the "tack free time". Therefore the samples are set up on a drying recorder from ByK Gardner, where a needle is moving with a constant speed over the coated substrate for 24 h. The recording is carried out in the dark, at room temperature. The "tack free time" is the period of time needed for the sample to cure in such a manner that no tack is left on the surface upon touch of the needle in the recorder.

The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the one of the non-irradiated one), the more "photolatent" is the catalyst.

The catalysts which are used in the test as well as the results are summarized in the following table 2.

TABLE 2

| | Tack free time stage 3/4 (h) | |
|---|---|---|
| Catalysts | No irradiation | 2*100 W 5 m/min |
| Compound of example 1 | 9.5 | 2.5 |
| Compound of example 2 | 10.5 | 3 |
| Compound of example 3 | 5.5 | 2 |
| Compound of example 4 | 5.5 | 2.5 |
| Compound of example 8 | 7.5 | 3.5 |
| Compound of example 9 | 11 | 2.5 |

Example A3

The following commercially available 1,3-diketones were used:

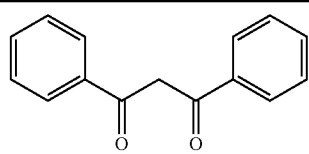

CAS 120-46-7

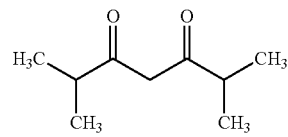

CAS 18362-64-6

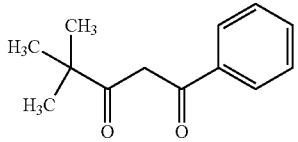

CAS 13988-67-5

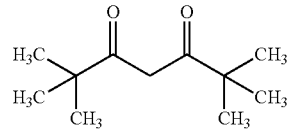

CAS 1118-71-4

The testing samples are prepared by adding the Ti catalyst and 1,3-diketone additive to 7.52 g of component A of the basic testing formulation of example A1. After mixing the component A with 2.0 g of component B, the visual pot-life of the formulation (time where no change in viscosity is visible), the time to considerable viscosity, and the time to high viscosity are observed.

The catalysts and additives which are used in the test as well as the results of the tests are collected in the following table 3.

TABLE 3

| Catalyst/(g) | Additive/ (g) | Visual Pot-life (min.) | Considerably viscous (min.) | Highly viscous (min.) |
|---|---|---|---|---|
| — | — | >600 | | >3000 |
| Compound of Example 1/ 0.087 | — | 90 | 140 | 160 |
| Compound of Example 1/ 0.087 | CAS 118-71-4/ 0.022 | 240 | 480 | 540 |
| Compound of Example 9/ 0.084 | — | 50 | 90 | 120 |
| Compound of Example 9/ 0.084 | CAS 120-46-7/ 0.021 | 240 | 420 | 480 |
| Compound of Example 3/ 0.070 | — | 50 | 90 | 110 |
| Compound of Example 3/ 0.070 | CAS 18362-64-6/ 0.017 | 120 | 480 | 540 |
| Compound of Example 4/ 0.071 | — | 50 | 110 | 120 |
| Compound of Example 4/ 0.071 | CAS 13988-67-5/ 0.018 | 240 | 420 | 480 |
| Compound of Example 8/ 0.080 | — | 60 | 120 | 180 |
| Compound of Example 8/ 0.080 | CAS 1118-71-4/ 0.020 | 360 | 600 | 720 |

TABLE 3-continued

| Catalyst/(g) | Additive/ (g) | Visual Pot-life (min.) | Considerably viscous (min.) | Highly viscous (min.) |
|---|---|---|---|---|
| Compound of Example 10/ 0.099 | — | 60 | 150 | 170 |
| Compound of Example 10/ 0.099 | CAS 120-46-7/ 0.025 | 360 | 540 | 660 |
| Compound of Example 11/ 0.108 | — | 60 | 180 | 240 |
| Compound of Example 11/ 0.108 | CAS 18362-64-6/ 0.027 | 600 | 1440 | 1800 |
| Compound of Example 7/ 0.080 | — | 60 | 180 | 230 |
| Compound of Example 7/ 0.080 | CAS 13988-67-5/ 0.020 | 600 | 1020 | 1200 |

The invention claimed is:

1. Ti-chelate catalyst compounds of formula I

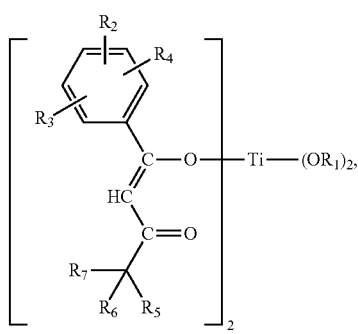

(I)

wherein
$R_1$ denotes phenyl or naphthyl, both of which are substituted by one or more $R'_2$, $R'_3$ or $R'_4$,
or the two $R_1$ together are unsubstituted linear or branched $C_1$-$C_8$ alkylene, linear or branched $C_1$-$C_8$ alkylene which is substituted by one or more phenyl or benzoyl,
or the two $R_1$ together are phenylene or biphenylene, wherein said phenylene or biphenylene are unsubstituted or are substituted by one or more $R'_2$, $R'_3$ or $R'_4$;
$R_2$, $R_3$ and $R_4$ independently of each other are hydrogen or $C_1$-$C_4$alkoxy;
$R'_2$, $R'_3$, and $R'_4$ independently of each other are hydrogen or linear or branched $C_1$-$C_4$ alkyl;
$R_5$, $R_6$ and $R_7$ independently of each other are linear or branched $C_1$-$C_4$ alkyl.

2. Compounds of the formula I according to claim 1, wherein
$R_1$ is phenyl which is substituted by one or more $R'_2$, $R'_3$ or $R'_4$;
or the two $R_1$ together are unsubstituted linear or branched $C_1$-$C_6$alkylene, linear or branched $C_1$-$C_6$alkylene which is substituted by one or more phenyl or benzoyl, or the two $R_1$ together are biphenylene;
$R'_2$, $R'_3$, $R'_4$ independently of each other are hydrogen or $C_1$-$C_4$alkyl;
$R_5$, $R_6$ and $R_7$ are $C_1$-$C_4$alkyl.

3. Ti-chelate catalyst formulation, comprising
(i) at least one compound of the formula IA

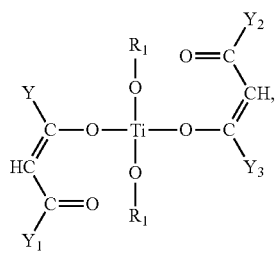

(IA)

wherein
$R_1$ denotes phenyl or naphthyl, both of which are substituted by one or more $R'_2$, $R'_3$ or $R'_4$,
or the two $R_1$ together are unsubstituted linear or branched $C_1$-$C_8$ alkylene, linear or branched $C_1$-$C_8$ alkylene which is substituted by one or more phenyl or benzoyl,
or the two $R_1$ together are phenylene or biphenylene, wherein said phenylene or biphenylene are unsubstituted or are substituted by one or more $R'_2$, $R'_3$ or $R'_4$;
Y is

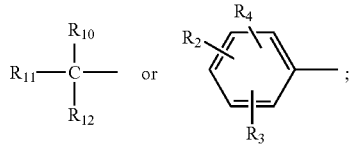

$Y_1$ is

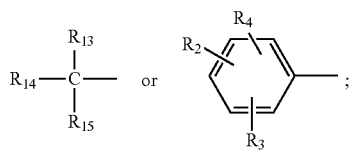

$Y_2$ is

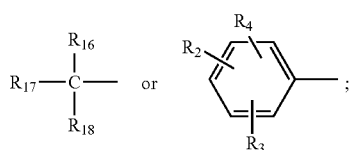

$Y_3$ is

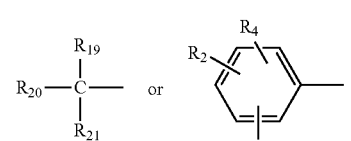

$R_2$, $R_3$, and $R_4$ independently of each other are hydrogen, linear or branched $C_1$-$C_{12}$ alkyl or $C_1$-$C_{12}$ alkoxy;

$R'_2$, $R'_3$, and $R'_4$ independently of each other are hydrogen or linear or branched $C_1$-$C_4$ alkyl;

$R_{10}$, $R_{11}$, $R_{12}$, $R_{13}$, $R_{14}$, $R_{15}$, $R_{16}$, $R_{17}$, $R_{18}$, $R_{19}$, $R_{20}$ and $R_{21}$ independently of one another are $C_1$-$C_4$ alkyl; and (ii) at least one chelate ligand compound of the formula IIa, IIb or IIc

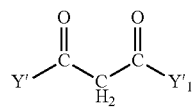 (IIa)

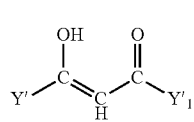 (IIb)

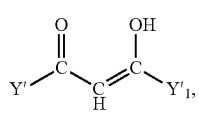 (IIc)

wherein

Y' is

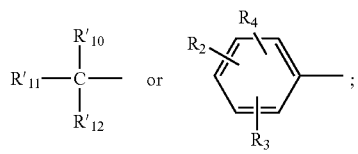

Y'$_1$ is

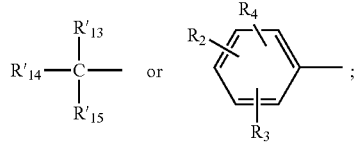

and $R'_{10}$, $R'_{11}$, $R'_{12}$, $R'_{13}$, $R'_{14}$ and $R'_{15}$ independently of one another are $C_1$-$C_4$ alkyl.

4. Ti-chelate catalyst formulation according to claim 3, wherein the compounds of formula IA $R_1$ is phenyl which is substituted by one or more $R'_2$, $R'_3$ or $R'_4$;

or the two $R_1$ together are unsubstituted linear or branched $C_1$-$C_6$alkylene, linear or branched $C_1$-$C_6$alkylene which is substituted by one or more phenyl or benzoyl, or the two $R_1$ together are biphenylene;

$R_2$, $R_3$ and $R_4$ independently of each other are hydrogen or $C_1$-$C_4$alkoxy;

$R'_2$, $R'_3$, $R'_4$ independently of each other are hydrogen or $C_1$-$C_4$alkyl;

Y is

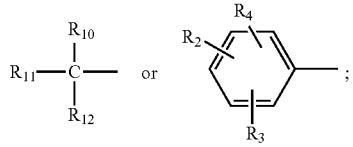

Y$_1$ is

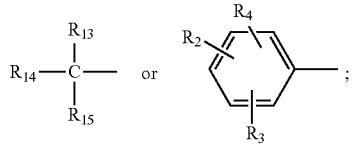

Y$_2$ is

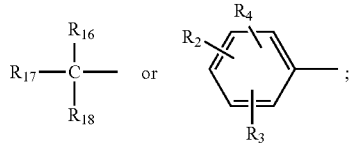

Y$_3$ is

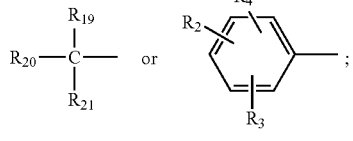

$R_{10}$, $R_{11}$, $R_{12}$, $R_{13}$, $R_{14}$, $R_{15}$, $R_{16}$, $R_{17}$, $R_{18}$, $R_{19}$, $R_{20}$ and $R_{21}$ are $C_1$-$G_4$alkyl.

5. A catalyst for polyaddition or polycondensation reactions comprise the Ti-chelate catalyst compound according to claim 1 wherein the reactions are catalysed by Lewis-acid reactants.

6. A polymerizable composition comprising
(a) at least one blocked or unblocked isocyanate or isothiocyanate component,
(b) at least one polyol; and
(c1) at least one Ti-chelate catalyst compound as defined in claim 1, or
(c2) at least one Ti-chelate catalyst formulation as defined in claim 3.

7. A polymerizable composition according to claim 6, comprising-in addition to components (a), (b) and (c1) or (c2) a further additive (d) of a photosensitizer compound.

8. A polymerizable composition according to claim 6, which comprises 0.001 to 15% by weight of (c1) or (c2), based on the total composition.

9. A process for polymerizing compounds, which are capable to crosslink in the presence of a Lewis acid, wherein the Ti-chelate catalyst compound as defined in claim 1 is added to said compounds which are capable to crosslink in the presence of a Lewis acid, and the resulting mixture is irradiated with electromagnetic radiation of a wavelength range of 200-800 nm.

10. A process according to claim 9, wherein the component which is capable to crosslink in the presence of a Lewis acid is a mixture of (a) a blocked or unblocked isocyanate or isothiocyanate component and (b) a polyol.

11. A process for polymerizing compounds, which are capable to crosslink in the presence of a Lewis acid, wherein the Ti-chelate catalyst compound as defined in claim 1 is added to said compounds which are capable to crosslink in the presence of a Lewis acid, and the resulting mixture is subjected to a heat treatment, or the mixture is irradiated with electromagnetic radiation of a wavelength range of 200-800 nm and simultaneously with or after the irradiation subjected to a heat treatment.

12. A process according to claim 9 for the preparation of adhesives, sealings, coatings, potting components, printing inks, printing plates, foams, moulding compounds, or photostructured layers.

13. A method of using the polymerizable composition according to claim 6 comprising incorporating the polymerizable composition in adhesives, coatings, sealings, potting components, printing inks, printing plates, foams, moulding compounds, or photostructured layers.

14. A coated substrate coated on at least one surface with a composition according to claim 6.

15. A polymerized or crosslinked composition obtained by curing a polymerizable composition according to claim 6.

16. A catalyst for polyaddition or polycondensation reactions comprise the Ti-chelate catalyst formulation according to claim 3, wherein the reactions are catalysed by Lewis-acid reactants.

17. A process for polymerizing compounds, which are capable to crosslink in the presence of a Lewis acid, wherein the Ti-chelate catalyst formulation as defined in claim 4 is added to said compounds which are capable to crosslink in the presence of a Lewis acid, and the resulting mixture is irradiated with electromagnetic radiation of a wavelength range of 200-800 nm.

18. A polymerizable composition according to claim 8, which comprises 0.01 to 5% by weight of (c1) or (c2) based on the total composition.

* * * * *